(12) United States Patent
Rarick

(10) Patent No.: US 8,239,441 B2
(45) Date of Patent: Aug. 7, 2012

(54) LEADING ZERO ESTIMATION MODIFICATION FOR UNFUSED ROUNDING CATASTROPHIC CANCELLATION

(75) Inventor: Leonard D. Rarick, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1119 days.

(21) Appl. No.: 12/121,053

(22) Filed: May 15, 2008

(65) Prior Publication Data

US 2009/0287757 A1    Nov. 19, 2009

(51) Int. Cl.
*G06F 7/38* (2006.01)
(52) U.S. Cl. ...................................................... 708/523
(58) Field of Classification Search .................... None
See application file for complete search history.

(56) References Cited

U.S. PATENT DOCUMENTS

| | | | | |
|---|---|---|---|---|
| 5,880,948 A | * | 3/1999 | Nachbauer | 363/95 |
| 5,957,997 A | * | 9/1999 | Olson et al. | 708/205 |
| 6,275,838 B1 | | 8/2001 | Blomgren et al. | |
| 6,460,134 B1 | | 10/2002 | Blomgren et al. | |
| 6,542,915 B1 | * | 4/2003 | Dibrino et al. | 708/501 |
| 6,542,916 B1 | | 4/2003 | Hinds et al. | |
| 6,557,021 B1 | * | 4/2003 | Brooks et al. | 708/496 |
| 6,654,776 B1 | * | 11/2003 | Ott et al. | 708/211 |
| 6,889,241 B2 | | 5/2005 | Pangal et al. | |
| 7,080,111 B2 | | 7/2006 | Pangal et al. | |
| 7,099,910 B2 | | 8/2006 | Brooks et al. | |
| 7,392,273 B2 | | 6/2008 | Gerwig et al. | |
| 7,730,117 B2 | | 6/2010 | Fleischer et al. | |
| 7,912,887 B2 | | 3/2011 | Dockser et al. | |
| 8,046,399 B1 | | 10/2011 | Inaganti et al. | |
| 2005/0228844 A1 | | 10/2005 | Dhong et al. | |
| 2009/0150654 A1 | * | 6/2009 | Oberman et al. | 712/221 |

OTHER PUBLICATIONS

U.S. Appl. No. 12/020,486, entitled "Fused Multiply-Add Rounding and Unfused Multiply-Add Rounding in a Single Multiply-Add Module", by Murali K. Inaganti and Leonard D. Rarick, filed Jan. 25, 2008.
U.S. Appl. No. 12/057,894, entitled "Processor which Implements Fused and Unfused Multiply-Add Instructions in a Pipelined Manner", by Leonard D. Rarick, filed May 15, 2008.
Schmookler, et al.; "Leading Zero Anticipation and Detection—A Comparison of Methods"; Proceedings of the 15th IEEE Symposium on Computer Arithmetic; 2001, pp. 7-12.
Eric Charles Quinnell, "Floating-Point Fused Multiply-Add Architectures," Chapter 2, PhD Dissertation at University of Texas at Austin, May 2007.
T. Lang and J. D. Bruguera, "Floating-Point Fused Multiply-Add with Reduced Latency," Proceedings of the 2002 IEEE International Conference on Computer Design: VLSI in Computers and Processors, pp. 145-150, 2002.
E. Hokenek, R. Montoye and P.W. Cook, "Second-Generation RISC Floating Point with Multiply-Add Fused," IEEE Journal of Solid-State Circuits, vol. 25, pp. 1207-1213, Oct. 1990.
A. Naini, A. Dhablania, W. James and D. Das Sarma, "1 GHz HAL Sparc64 Dual Floating Point Unit with RAS Features," Proceedings of the 15th Symposium on Computer Arithmetic, pp. 173-183, 2001.

* cited by examiner

*Primary Examiner* — David H Malzahn
(74) *Attorney, Agent, or Firm* — Meyertons Hood Kivlin Kowert & Goetzel, P.C.; Jeffrey C. Hood; Joel L. Stevens

(57) ABSTRACT

Modifying a leading zero estimation during an unfused multiply add operation of (A*B)+C. A plurality of terms x and y may be received, and each may be based on truncated terms s and t (e.g., in performing the unfused multiply add operation) and the shifted C term. A first leading zero estimation may be calculated based on the terms x and y. It may be determined if near total catastrophic cancellation has occurred. A carry in from a right most number of bits of the terms s and t and the most significant truncated bits of s and t may be used to generate a second leading zero estimation based on the first leading zero estimation if the near total catastrophic cancellation has occurred.

18 Claims, 15 Drawing Sheets

```
term s  =  XX.XXXXXXXX_XXXXXXXX_XXXXXXXX_XXXXXXXX_XXXXXXXX_XXXXXX
term t  =  XX.XXXXXXXX_XXXXXXXX_XXXXXXXX_XXXXXXXX_XXXXXXXX_XXXXXX
```

FIG. 6A

```
between 1 and 2 =  01.XXXXXXXX_XXXXXXXX_XXXXXXX
between 2 and 4 =  1X.XXXXXXXX_XXXXXXXX_XXXXXX
```

FIG. 6B

```
truncated term s  =  XX.XXXXXXXX_XXXXXXXX_XXXXXX00_00000000_00000000_000000
truncated term t  =  XX.XXXXXXXX_XXXXXXXX_XXXXXX00_00000000_00000000_000000
                                                ↑
```

FIG. 6C

```
zeroed terms of s  =  00.00000000_00000000_000000XX_XXXXXXXX_XXXXXXXX_XXXXXX
zeroed terms of t  =  00.00000000_00000000_000000XX_XXXXXXXX_XXXXXXXX_XXXXXX
                                                ↑
```

FIG. 6D

```
truncated term s  =  XX.XXXXXXXX_XXXXXXXX_XXXXXX00_00000000_00000000_000000
truncated term t  =  XX.XXXXXXXX_XXXXXXXX_XXXXXX00_00000000_00000000_000000
                                             K
                                             R
                                             N
```

FIG. 6E

```
truncated term s  =  XX.XXXXXXXX_XXXXXXXX_XXXXXX00_00000000_00000000_000000
truncated term t  =  XX.XXXXXXXX_XXXXXXXX_XXXXXX00_00000000_00000000_000000
                                             X  (=Xs)
                                             X  (=Xt)
                                             L
                                             S
                                             M
```

FIG. 6F

```
truncated term s  =  XX.XXXXXXXX_XXXXXXXX_XXXXXXCC_C0000000_00000000_000000
truncated term t  =  XX.XXXXXXXX_XXXXXXXX_XXXXXXCC_C0000000_00000000_000000
shifted C term  =  ..CCCC.CCCCCCCC_CCCCCCCC_CCCCCCCC_CCCCCCCC_CCCCCCCC_CCCCCCCC_..
```

FIG. 6G

```
sum out    ..CCCCCXX.XXXXXXXX_XXXXXXXX_XXXXXXCC_CCCCCCCC_CCCCCCCC_CCCCCCCC_..
carry out  ..0000XXX.XXXXXXXX_XXXXXXXX_XXXXX000_00000000_00000000_00000..
```

FIG. 6H

```
sum output    ..CCCCXXX.XXXXXXXX_XXXXXXXX_XXXXXXCC_CCCCCCCC_CCCCCCCC_CCCCCCCC_..
carry output  ..000XXXX.XXXXXXXX_XXXXXXXX_XXXX00C0_00000000_00000C00_00000000_..
```

FIG. 6I

```
sum output    ..1111111.11001100_10001101_11100011_11111111_11111111_11111111_..
carry output  ..0000000.01000110_11100100_000110C0_00000000_00000C00_00000000_..
```

FIG. 6K

```
sum output    ..1111111.11001100_10001101_11100011_11111111_11111111_11111111_..
carry output  ..0000000.01000110_11100100_000110C0_00000000_00000C00_00000000_..
```
```
                                      L
                                      S
                                      M
                                      Xs
                                      Xt
```

FIG. 6L

```
sum output    ..1111111.11001100_10001101_11100011_11111111_11111111_11111111_..
carry output  ..0000000.01000110 11100100 000110C0 00000000 00000C00 00000000 ..
```
```
                                    101
```

FIG. 6M

```
truncated term s  =  XX.XXXXXXXX_XXXXXXXX_XXXXXX00_00000000_00000C00_000000
truncated term t  =  XX.XXXXXXXX_XXXXXXXX_XXXXXX00_00000000_00000C00_000000
shifted C term    = ..11CC.CCCCCCCC_CCCCCCCC_CCCCCCC1_11111111_11111111_11111111_..
```

FIG. 6N

```
sum output    ..11111XX.XXXXXXXX_XXXXXXXX_XXXXXXC1_11111111_11111111_11111111_..
carry output  ..0000XXX.XXXXXXXX_XXXXXXXX_XXXXX0C0_00000000_00000C00_00000000_..
```

FIG. 6O

```
sum output    ...1111XXX.XXXXXXXX_XXXXXXXX_XXXXXXC1_11111111_11111111_11111111_...
carry output  ...000XXXX.XXXXXXXX_XXXXXXXX_XXXX0000_00000000_00000000_00000000_...
maximum sum of bits K+R+N                    11
```

FIG. 6P

```
truncated term s =   XX.XXXXXXXX_XXXXXXXX_XXXXXX00_00000000_00000000_000000
truncated term t =   XX.XXXXXXXX_XXXXXXXX_XXXXXX00_00000000_00000000_000000
shifted C term   = ..1CCC.CCCCCCCC_CCCCCCCC_CCCCCC11_11111111_11111111_11111111_...
```

FIG. 6Q

```
sum output    ..1110XX.XXXXXXXX_XXXXXXXX_XXXXXX11_11111111_11111111_11111111_...
carry output  ..0000XXX.XXXXXXXX_XXXXXXXX_XXXXX000_00000000_00000000_00000000_...
```

FIG. 6R

```
sum output    ...1111XXX.XXXXXXXX_XXXXXXXX_XXXXXX11_11111111_11111111_11111111_..
carry output  ...000XXXX.XXXXXXXX_XXXXXXXX_XXXX0000_00000000_00000000_00000000_...
maximum sum of bits K+R+N                    11
```

FIG. 6S

```
term s = 01.11111111_11111111_11111111_11111111_11111111_000101
term t = 00.00000000_00000000_00000000_00000000_00000001_000000
```

FIG. 6T

```
product = 10.00000000_00000000_00000000_00000000_00000000_000101
```

FIG. 6U

```
rounded product =   10.00000000_00000000_000000
the shifted C term =  1.11111111_11111111_1111111
```

FIG. 6V

```
correct result     00.00000000_00000000_0000001
```

FIG. 6W

```
truncated term s = 01.11111111_11111111_11111100_00000000_00000000_000000
truncated term t = 00.00000000_00000000_00000000_00000000_00000000_000000
```

FIG. 6X

```
shifted C term = ..1110.00000000_00000000_00000001_11111111_11111111_11111111_...
```

FIG. 6Y

```
sum output    ...1111111.11111111_11111111_11111101_11111111_11111111_11111111_..
carry output  ...0000000.00000000_00000000_00000000_00000000_00000000_00000000_..
```

FIG. 6Z

```
sum output    ...1111111.11111111_11111111_11111111_11111111_11111111_11111111_..
carry output  ...0000000.00000000_00000000_00000000_00000000_00000000_00000000_..
maximum sum of bits K+R+N                  11
```

FIG. 6AA

```
truncated term s  =   XX.XXXXXXXX_XXXXXXXX_XXXXXX00_00000000_00000000_000000
truncated term t  =   XX.XXXXXXXX_XXXXXXXX_XXXXXX00_00000000_00000000_000000
shifted C term    = ..111C.CCCCCCCC_CCCCCCCC_CCCCCCCC_11111111_11111111_11111111_..
```

FIG. 6AB

```
sum output    ...11111XX.XXXXXXXX_XXXXXXXX_XXXXXXCC_11111111_11111111_11111111_..
carry output  ...0000XXX.XXXXXXXX_XXXXXXXX_XXXXX000_00000000_00000000_00000000_..
```

FIG. 6AC

```
sum output    ...1111XXX.XXXXXXXX_XXXXXXXX_XXXXXXCC_11111111_11111111_11111111_..
carry output  ...000XXXX.XXXXXXXX_XXXXXXXX_XXXX0000_00000000_00000000_00000000_..
maximum sum of bits L+S+M+Xs+Xt              101
```

FIG. 6AD

```
truncated term s  =   XX.XXXXXXXX_XXXXXXXX_XXXXXX00_00000000_00000000_000000
truncated term t  =   XX.XXXXXXXX_XXXXXXXX_XXXXXX00_00000000_00000000_000000
shifted C term    = ..11CC.CCCCCCCC_CCCCCCCC_CCCCCCC1_11111111_11111111_11111111_..
```

FIG. 6AE

```
sum output    ...11111XX.XXXXXXXX_XXXXXXXX_XXXXXXC1_11111111_11111111_11111111_..
carry output  ...0000XXX.XXXXXXXX_XXXXXXXX_XXXXX000_00000000_00000000_00000000_..
```

FIG. 6AF

```
sum output    ...1111XXX.XXXXXXXX_XXXXXXXX_XXXXXC1_11111111_11111111_11111111_...
carry output  ...000XXXX.XXXXXXXX_XXXXXXXX_XXXX0000_C0000000_00000000_00000000_...
maximum sum of bits L+S+M+Xs+Xt              101
```

FIG. 6AG

```
term s  =  00.11111111_11111111_11111111_11111111_11111111_000000
term t  =  00.00000000_00000000_00000000_00000000_00000001_000000
```

FIG. 6AH

```
product =  01.00000000_00000000_00000000_00000000_00000000_000000
```

FIG. 6AI

```
rounded product =   01.00000000_00000000_0000000
the shifted C term =   .11111111_11111111_11111101_
```

FIG. 6AJ

```
correct result    00.00000000_00000000_00000011_
```

FIG. 6AK

```
truncated term s  =  00.11111111_11111111_11111100_00000000_00000000_000000
truncated term t  =  00.00000000_00000000_00000000_00000000_00000000_000000
```

FIG. 6AL

```
shifted C term = ..1111.00000000_00000000_00000010_11111111_11111111_11111111_...
```

FIG. 6AM

```
sum output    ...1111111.11111111_11111111_11111110_11111111_11111111_11111111_...
carry output  ...0000000.00000000_00000000_00000000_C0000000_00000000_00000000_...
```

FIG. 6AN

```
sum output    ...1111111.11111111_11111111_11111111_11111111_11111111_11111111_...
carry output  ...0000000.00000000_00000000_00000000_00000000_00000000_00000000_...
maximum sum of bits L|S|M|Xs|Xt              101
```

FIG. 6AO

```
sum output    ...1111111.11111111_00000000_00000001_11111111_11111111_11111111
carry output  ...0000000.00000001_00000000_00000000_00000000_00000000_00000000
                                              K                              +1
                                              R
```

FIG. 6AP

```
sum output    ...1111111.11111111_00000000_00000011_11111111_11111111_11111111
carry output  ...0000000.00000001_00000000_00000000_00000000_00000000_00000000
                                              K                              +1
                                              R
```

FIG. 6AQ

```
sum output    ...1111111.11111111_00000000_000001c1_11111111_11111111_11111111
carry output  ...0000000.00000001_00000000_00000000_00000000_00000000_00000000
                                              K                              +1
                                              R
```

FIG. 6AR

```
sum output    ...1111111.11111111_00000000_00001bc1_11111111_11111111_11111111
carry output  ...0000000.00000001_00000000_00000000_00000000_00000000_00000000
                                              K                              +1
                                              R
```

FIG. 6AS

```
sum output    ...1111111.11111111_11111111_11111101_11111111_11111111_111111
carry output  ...0000000.00000000_00000000_00000000_00000000_00000000_000000
                                              K                              +?
                                              R
```

FIG. 6AT

```
sum output    ...1111111.11111111_11111111_111110c1_11111111_11111111_111111
carry output  ...0000000.00000000_00000000_00000000_00000000_00000000_000000
                                              K                              +?
                                              R
```

FIG. 6AU

```
sum output    ...1111111.11111111_11111111_11110bc1_11111111_11111111_111111
carry output  ...0000000.00000000_00000000_00000000_00000000_00000000_000000
                                              K                              +?
                                              R
```

FIG. 6AV

```
sum output    ...1111111.11111111_11111111_11110b11_11111111_11111111_111111
carry output  ...0000000.00000000_00000000_00000000_00000000_00000000_000000
                                              K
                                              R
```

FIG. 6AW

```
sum output    ...1111111.11111111_11111111_1110abc1_11111111_11111111_111111
carry output  ...0000000.00000000_00000000_00000000_00000000_00000000_000000
                                                   K                      +?
                                                   R
```

FIG. 6AX

```
sum output    ...1111111.11111111_11111111_1110ab11_11111111_11111111_111111
carry output  ...0000000.00000000_00000000_00000000_00000000_00000000_000000
                                                   K
                                                   R
```

FIG. 6AY

```
sum output    ...1111111.11111111_11111111_11111111_11111111_11111111_11111111
carry output  ...0000000.00000000_00000000_00000000_00000000_00000000_00000000
                                                   K                      +?
                                                   R
```

FIG. 6AZ

```
sum output    ...1111111.11111111_00000000_00000000_11111111_11111111_11111111
carry output  ...0000000.00000001_00000000_00000000_00000000_00000000_00000000
                                                   KW                     +1
                                                   S
```

FIG. 6BA

```
sum output    ...1111111.11111111_00000000_00000001_11111111_11111111_11111111
carry output  ...0000000.00000001_00000000_00000000_00000000_00000000_00000000
                                                   KW                     +1
                                                   S
```

FIG. 6BB

```
sum output    ...1111111.11111111_00000000_0000001d_11111111_11111111_11111111
carry output  ...0000000.00000001_00000000_00000000_00000000_00000000_00000000
                                                   KW                     +1
                                                   S
```

FIG. 6BC

```
sum output    ...1111111.11111111_00000000_000001cd_11111111_11111111_11111111
carry output  ...0000000.00000001_00000000_00000000_00000000_00000000_00000000
                                                   KW                     +1
                                                   S
```

FIG. 6BD

```
sum output    ...1111111.11111111_00000000_00001bcd_11111111_11111111_11111111
carry output  ...0000000.00000001_00000000_00000000_00000000_00000000_00000000
                                                   KW                     +1
                                                   S
```

FIG. 6BE

```
sum output    ...1111111.11111111_11111111_11111110_11111111_11111111_11111111
carry output  ...0000000.00000000_00000000_00000000_00000000_00000000_00000000
                                                KW                          +?
                                                S
```

FIG. 6BF

```
sum output    ...1111111.11111111_11111111_1111110d_11111111_11111111_11111111
carry output  ...0000000.00000000_00000000_00000000_00000000_00000000_00000000
                                                KW                          +?
                                                S
```

FIG. 6BG

```
sum output    ...1111111.11111111_11111111_111110cd_11111111_11111111_11111111
carry output  ...0000000.00000000_00000000_00000000_00000000_00000000_00000000
                                                KW                          +?
                                                S
```

FIG. 6BH

```
sum output    ...1111111.11111111_11111111_11110bcd_11111111_11111111_11111111
carry output  ...0000000.00000000_00000000_00000000_00000000_00000000_00000000
                                                KW
                                                S
```

FIG. 6BI

```
sum output    ...1111111.11111111_11111111_1110abcd_11111111_11111111_11111111
carry output  ...0000000.00000000_00000000_00000000_00000000_00000000_00000000
                                                KW
                                                S
```

FIG. 6BJ

```
sum output    ...1111111.11111111_11111111_11111111_11111111_11111111_11111111
carry output  ...0000000.00000000_00000000_00000000_00000000_00000000_00000000
                                                KW                          +?
                                                S
```

FIG. 6BK

```
------------------------------ MSB = 1 ---------------------------------
              positions          LZ cases              LO cases
 stop bit    for leading       ---------------       ---------------
 location     one bit          case   positions      case   positions
----------+----------------+------+--------------+------+--------------+
    26    |26 25           |  4   |26 25         |  8   |26 25         |
    25    |   25 24        |  3   |26 25 24      |  7   |   25 24      |
    24    |      24 23     |  2   |   25 24      |  6   |      24 23   |
    23    |         23 22  |  1   |   25 24 23   |  5   |      24 23   |
   none   |   none         |      |              |  9   |   25 24      |
----------+----------------+------+--------------+------+--------------+

------------------------------ MSB = 0 ---------------------------------
              positions          LZ cases              LO cases
 stop bit    for leading       ---------------       ---------------
 location     one bit          case   positions      case   positions
----------+----------------+------+--------------+------+--------------+
    26    |26 25           | 14   |26 25         | 19   |26 25         |
    25    |   25 24        | 13   |26 25 24      | 18   |   25 24 23 22|
    24    |      24 23     | 12   |   25 24 23   | 17   |      24 23 22|
    23    |         23 22  | 11   |   25 24 23   | 16   |      24 23 22|
    22    |            22 21| 10  |   25 24 23 22| 15   |      24 23 22|
   none   |   none         |      |              | 20   |   25 24 23   |
----------+----------------+------+--------------+------+--------------+
```

FIG. 7

```
------------------------------ MSB = 1 ---------------------------------
              positions          LZ cases              LO cases
 stop bit    for leading       ---------------       ---------------
 location     one bit          case   positions      case   positions
----------+----------------+------+--------------+------+--------------+
    26    |26 25           |  4   |26 25         |  8   |26 25         |
    25    |   25 24        |  3   |26 25 24      |  7   |   25 24      |
    24    |   25 24        |  2   |   25 24      |  6   |      24 23   |
    23    |   25 24        |  1   |   25 24 23   |  5   |      24 23   |
   none   |   25 24        |      |              |  9   |   25 24      |
----------+----------------+------+--------------+------+--------------+

------------------------------ MSB = 0 ---------------------------------
              positions          LZ cases              LO cases
 stop bit    for leading       ---------------       ---------------
 location     one bit          case   positions      case   positions
----------+----------------+------+--------------+------+--------------+
    26    |26 25           | 14   |26 25         | 19   |26 25         |
    25    |   25 24        | 13   |26 25 24      | 18   |   25 24 23 22|
    24    |   25 24        | 12   |   25 24 23   | 17   |      24 23 22|
    23    |   25 24        | 11   |   25 24 23   | 16   |      24 23 22|
    22    |   25 24        | 10   |   25 24 23 22| 15   |      24 23 22|
   none   |   25 24        |      |              | 20   |   25 24 23   |
----------+----------------+------+--------------+------+--------------+
```

FIG. 8

```
    When in case           take action              result positions
    -----------            -----------              -------------------------------
     1 &  K=1              no change                    25 and 24
     1 &  K=0              subtract 1                         24 and 23
     2                     no change                    25 and 24
     3 &  K=1              add 1                 26 and 25
     3 &  K=0              no change                    25 and 24
     4                     no change             26 and 25
     5                     subtract 1                         24 and 23
     6                     subtract 1                         24 and 23
     7                     no change                    25 and 24
     8                     no change             26 and 25
     9                     no change                    25 and 24
    10 &  K=1              no change                    25 and 24
    10 &  K=0 &  W=1       subtract 1                         24 and 23
    10 &  K=0 &  W=0       subtract 2                                23 and 22
    11 &  K=1              no change                    25 and 24
    11 &  K=0              subtract 1                         24 and 23
    12 &  (K=1 or d=1)     no change                    25 and 24
    12 &  K=0 &   d=0      subtract 1                         24 and 23
    13 &  K=1              add 1                 26 and 25
    13 &  K=0              no change                    25 and 24
    14                     no change             26 and 25
    15 &  K=1              subtract 1                         24 and 23
    15 &  K=0              subtract 2                                23 and 22
    16 &  k=0              subtract 2                                23 and 22
    16 &  K=1 &  d=1       subtract 1                         24 and 23
    16 &  K=1 &  d=0
        &  W=0             subtract 2                                23 and 22
    16 &  K=1 &  d=0
        &  W=1             subtract 1                         24 and 23
    17 &            d=1    subtract 1                         24 and 23
    17 &  K=1 &  d=0       subtract 2                                23 and 22
    17 &  K=0 &  d=0
        &  c=1 &  W=1      subtract 2                                23 and 22
    17 &  K=0 &  d=0
        &  (c=0 or W=0)    subtract 1                         24 and 23
    18 &  K=0 or b=0       no change                    25 and 24
    18 &  K=1 &  b=1
        &  (c=0 or W=0)    subtract 1                         24 and 23
    18 &  K=1 &  b=1
        &  c=1 &  W=1      subtract 2                                23 and 22
    19                     no change             26 and 25
    20 &  K=1              no change                    25 and 24
    20 &  K=0              subtract 1                         24 and 23
```

FIG. 9

LEADING ZERO ESTIMATION MODIFICATION FOR UNFUSED ROUNDING CATASTROPHIC CANCELLATION

FIELD OF THE INVENTION

The present invention relates to the field of processor architecture, and more particularly to a system and method for modifying a leading zero estimation during nearly total catastrophic cancellation in an unfused multiply add.

DESCRIPTION OF THE RELATED ART

In the computation of the multiply add operation (A*B)+C, where A, B, and C are floating point numbers, rounding is accomplished utilizing one of two techniques. The first technique is termed fused multiply-add rounding, and the second technique is termed unfused multiply-add rounding. Fused multiply-add rounding computes (A*B)+C exactly and then applies a rounding algorithm to obtain the final result. The other choice, called unfused multiply-add rounding, computes A*B, applies a rounding algorithm to the product, and then C is added to the rounded product. The result of this addition is then rounding with the rounding algorithm.

The floating-point add and normalize operations are performed with hardware support in the latter half of the multiply add operations described above. Because floating-point add and normalize operations include several separate constituent operations, the floating-point add and normalize operations are one of the slower mathematical operations on a computer system. Computer system designers have attempted to improve the performance of the floating-point add and normalize operations by parallelizing its constituent operations. To this end, some computer system designers have included a leading zero anticipator (LZA) (sometimes referred to as a "leading zero estimator") in floating-point circuitry to perform the floating-point add and normalize operations more efficiently.

LZAs predict the location of the leading (most significant) zero or the leading one bit of the result of a floating-point add operation in parallel with the add operation. More specifically, the LZA estimates the position of the leftmost zero bit in the result of the addition if the result is negative or the left-most one bit in the result if the result is positive. The estimate is then used to shift the mantissa of the result when normalizing the result following the floating-point add operation.

In order to estimate a location for the leading zero or the leading one, some LZAs compute some or all of a "propagate bit," a "generate bit," and a "kill bit" for each separate bit position i. (Note that the index i increases from left to right.)

These bits can be denoted as T, G, and Z where T is a propagate bit, G is a generate bit, and Z is a kill bit. Assuming that two terms, A and B, are to be added together (where $A_i$ denotes the ith bit in A and $B_i$ denotes the ith bit in B), T, G and Z can be determined for each bit position i in A and B as follows:

$T_i = A_i$ XOR $B_i$;
$G_i = A_i$ AND $B_i$; and
$Z_i =$ NOT($A_i$ OR $B_i$), where "NOT" represents a logical inversion.

Moreover, T, G and Z can be used to compute the location of the leading zero or the leading one using the expressions, $f_0 =$ NOT($T_0$)) AND $T_1$, and $f_i = T_{i-1}$ AND (($G_i$ AND NOT($Z_{i+1}$)) OR ($Z_i$ AND NOT ($G_{i+1}$))) OR NOT ($T_{i-1}$) AND (($Z_i$ AND NOT($Z_{i+1}$)) OR ($G_i$ AND NOT ($G_{i+1}$))), where $i > 0$.

In the expression above for $f_i$, if $f_i$ is equal to one (i.e., the "indicator" is "set") for a given position and no other position of greater significance has its indicator set, then the leading digit is at either i or i+1. Further examples of LZA operation can be found in "Leading Zero Anticipation and Detection—A Comparison of Methods" by Martin S. Schmookler and Kevin J. Nowka, Proceedings of the 15th IEEE Symposium on Computer Arithmetic, 2001, which is hereby incorporated by reference as though set forth fully herein.

Modification to the multiply add pipeline and more specifically the output of the LZA in the multiply add pipeline are desired to obtain a correct shift amount for the normalization of the addition result for unfused multiply add operations.

SUMMARY OF THE INVENTION

Various embodiments are presented of a system and method for producing a leading zero estimation during nearly total catastrophic cancellation in an unfused multiply add.

The method may include receiving a plurality of terms A, B, and C, wherein the terms A, B, and C are usable in calculating the unfused multiply add operation of (A*B)+C.

Terms s and t may be calculated as partial products of the A*B multiply operation. The terms s and t may be truncated (e.g., in the case of an unfused multiply add) to produce truncated s and truncated t, and the term C may be aligned to produce an aligned C term. Accordingly, a plurality of terms x and y may be produced from the truncated terms s and t and the aligned C term.

A first leading zero estimation may be calculated based on the plurality of terms x and y. Calculating the first leading zero estimation may include calculating a plurality of indicator bits and performing a leading zero determination using the plurality of indicator bits to produce the first leading zero estimation.

It may be determined if near total catastrophic cancellation has occurred. Determining if the near total catastrophic cancellation has occurred may include determining if the most significant bit of the computation (A*B)+C is proximate to least significant bits of the term C and the product of A and B.

One or more of a plurality of values MSB, L, S, M, Xs, and Xt may be determined. MSB may be the bit in the most significant position of the product, L may be a carry in from a right most number of bits of the terms s and t, S may be a rounding bit of the terms s and t, M may be a negate bit of the terms s, t, and C, and Xs and Xt may be the most significant truncated bits of s and t, respectively.

A second leading zero estimation may be generated based on the first leading zero estimation and one or more of the plurality of values MSB, L, S, M, Xs and Xt if the near total catastrophic cancellation has occurred. More specifically, the second leading zero estimation may include receiving the plurality of indicator bits indicated above and determining one or more modifications to the first leading zero estimation using the plurality of values. In one embodiment, generating the second leading zero estimation may be based on (e.g., only on) the terms MSB, L, Xs, and Xt. The second leading zero estimation may be a modified version of the first leading zero estimation. In some embodiments, the second leading zero estimation may replace the first leading zero estimation. Thus, the first leading zero estimation may be modified based on determining the one or more modifications to produce the second leading zero estimation. Note that calculating the first leading zero estimation may not be based on the one or more of the plurality of values MSB, L, S, M, Xs, and Xt. Note that performing the leading zero determination and determining the one or more modifications may be performed substantially in parallel.

The method may further include adding the terms x and y using a main adder in the multiply add pipeline and then modifying the sum using, for example, the values MSB, L, S, M, Xs, and/or Xt to produce a resulting term. Accordingly, the second leading zero estimation may be usable in performing the unfused multiply add operation. In particular, the method may further include performing a normalize operation on the resulting term from the add operation in the unfused multiply add operation using the second leading zero estimation.

Generating the first and/or second leading zero estimation may include using a stop bit at a location, wherein the location does not exceed a default stop bit location.

Alternatively, the leading zero estimation may account for near total catastrophic cancellation without modification. In particular, similar to above, the method may include receiving a plurality of terms x and y, wherein each of the plurality of terms x and y is based on previously truncated terms s and t and the aligned C term, determining if near total catastrophic cancellation has occurred, determining one or more of the plurality of values MSB, L, S, M, Xs, and Xt and calculating a leading zero estimation based on the plurality of terms x and y, wherein said calculating the leading zero estimation is also based on the one or more of the plurality of values MSB, L, S, M, Xs, and Xt if the near total catastrophic cancellation has occurred.

As already indicated, the method may further include performing a normalize operation resulting from the add operation in the unfused multiply add operation using the leading zero estimation.

In some embodiments, the methods described above may be embodied in a processor. More particularly, the processor may be configured to perform fused and unfused multiply add operations.

The processor may include a carry save adder (e.g., including a Wallace tree) configured to receive two multiply terms A and B and produce two partial products s and t. The two partial products s and t may be truncated if the multiply add operation is unfused.

The processor may further include compression logic, configured to receive the two partial products s and t and an aligned addition term C, and produce terms x and y based on the truncated partial products s and t and the aligned addition term C. The compression logic may include a three to two compressor (e.g., a full adder) and a half adder connected successively (in series).

The processor may include an adder coupled to the compression logic. The adder may be configured to receive the two terms x and y, and produce a resulting term for normalization.

The processor may include a leading zero anticipator (LZA). The LZA may include a first portion configured to receive the two terms x and y and determine indicator bits for determining the most significant bit of the resulting term. The LZA may further include a leading zero detector (LZD) configured to receive the indicator bits to determine the most significant bit of the resulting term. The LZA may include a second portion configured to receive the indicator bits and one or more of a plurality of values MSB, L, S, M, Xs, and Xt. The second portion may be configured to determine one or more modifications to the output of the LZD based on the indicator bits and the one or more of the plurality of values MSB, L, S, M, Xs, and Xt (e.g., the values MSB, L, Xs, and Xt). The second portion of the LZA may be configured to correct the output of the LZD for near total catastrophic cancellation. Thus, the LZA may be configured to provide a leading zero estimation, and the leading zero estimation may incorporate the one or more modifications to the output of the LZD if near total catastrophic cancellation occurs. Note that the LZD and the second portion may be configured to operate substantially in parallel.

The processor may further include a normalizer, configured to receive the leading zero estimation from the LZA and the resulting term from the adder to produce a normalized term corresponding to the output of the fused or unfused multiply add operation.

BRIEF DESCRIPTION OF THE DRAWINGS

A better understanding of the present invention can be obtained when the following detailed description of the preferred embodiment is considered in conjunction with the following drawings, in which:

FIGS. 6A-6BK are exemplary aligned terms and results corresponding to descriptions of various cases for modification of the LZD output; and FIGS. 7-9 are tables summarizing modifications to the LZD output.

Figure 1:
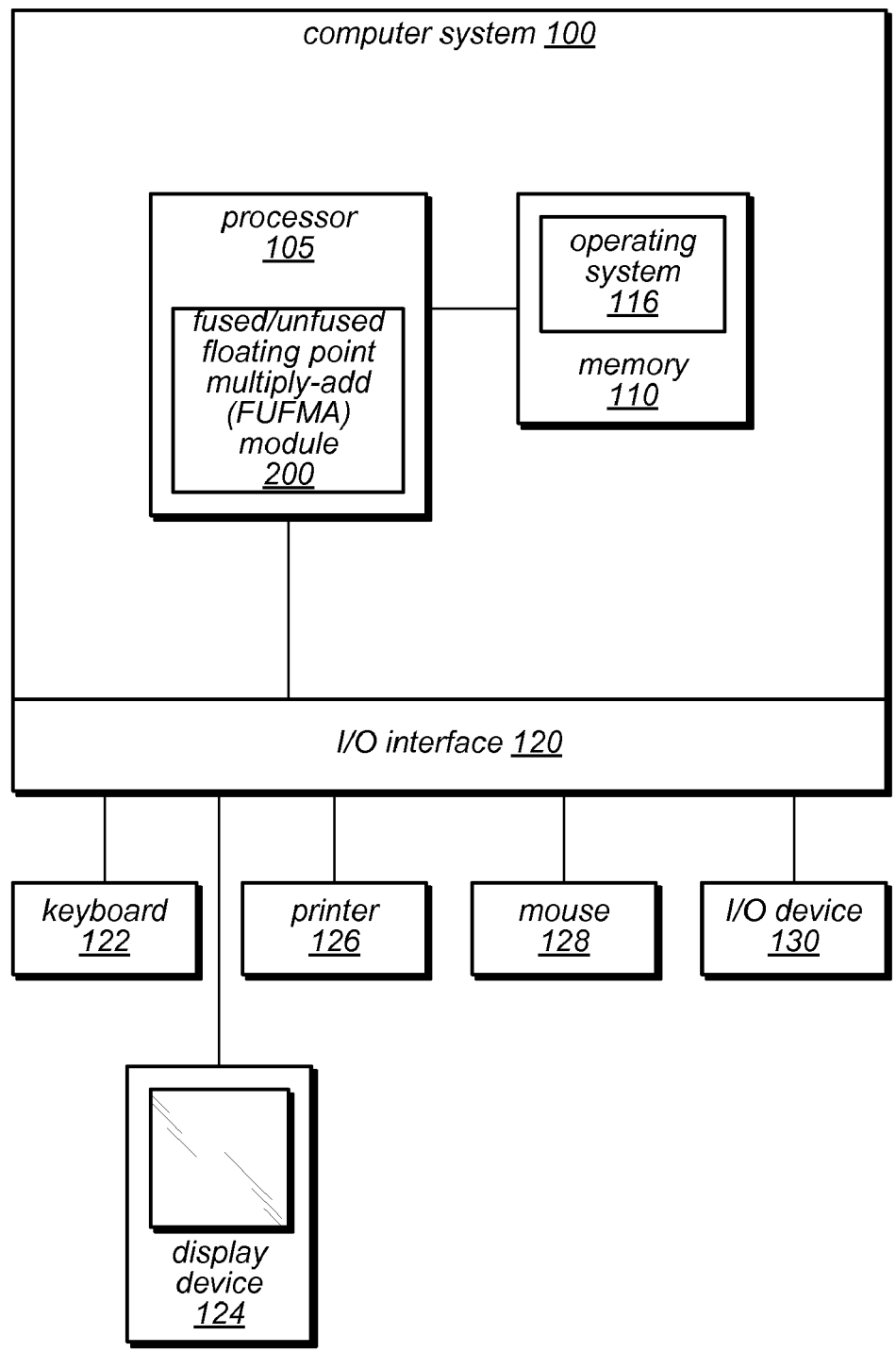
FIG. 1 illustrates an exemplary embodiment of a computer system including a processor with a fused-unfused floating point multiply-add (FUFMA) pipeline, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. patent application Ser. No. 12/020,486, titled "Fused Multiply-Add Rounding and Unfused Multiply-Add Rounding in a Single Multiply-Add Module", whose inventors are Murali K. Inaganti and Leonard D. Rarick, which was filed on Jan. 25, 2008.

U.S. patent application Ser. No. 11/964,611, titled "Efficient Leading Zero Anticipator", whose inventor is Leonard D. Rarick, which was filed on Dec. 26, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Fused Multiply-Add—multiplication of a first two values and addition of a third value without intermediate rounding. The instruction is a "fused" operation; no rounding is performed between the multiplication operation and the subsequent addition (or subtraction). Therefore, at most, one rounding step occurs.

Unfused Multiply-Add—multiplication of a first two values followed by rounding and addition of a third value followed by a second rounding. The instruction is treated as distinct (unfused) multiply and add/subtract operations, with rounding (e.g., according to IEEE Std. 754-1985) performed after each of the two operations.

Half Adder—a single bit adder that has two inputs, generally labelled A and B, and two outputs, the sum S and carry C. S is the two-bit XOR of A and B, and C is the AND of A and B.

Full Adder—a single bit adder that has three inputs and two outputs, the sum S and carry C. S is the three-bit XOR of the three inputs and C is the majority value of the three inputs.

Carry Save Adder (CSA)—a type of digital adder used in computer microarchitecture to compute the sum of three or more n-bit numbers in binary. A carry-save adder differs from other digital adders in that it outputs two numbers of the same or larger dimensions as the inputs, one which is a sequence of partial sum bits and another which is a sequence of carry bits.

Carry Propagate Adder (CPA)—an adder that is not a CSA. A propagate adder may propagate its carriers using ripples, carry lookahead or other methods. It has two input terms and one output term.

Carry Look-Ahead Adder—a specific CPA implementation used to speed up addition.

Leading Zero Anticipator (LZA)—A circuit typically used in conjunction with an adder for calculating the number of leading zeros and/or ones for operand normalization purposes.

Wallace Tree—a type of carry save adder, often used in hardware implementations.

FIG. 1—Exemplary Computer System

FIG. 1 illustrates a computer system 100 having a computer processor 105 including a fused/unfused floating point multiply add (FUFMA) pipeline. The processor may be any of various processing units, as desired. For example, the processor may be a central processing unit (CPU) of various types, including an x86 processor, e.g., a Pentium class, a PowerPC processor, a CPU from the SPARC family of RISC processors, as well as others. Other processor types such as microprocessors are envisioned.

As shown, the computer system may also include a memory medium 110, typically comprising RAM and referred to as main memory, which may be coupled to a host bus by means of memory controller. The main memory 110 may store an operating system 115 as well as application programs, etc., as well as other software for operation of the computer system. One or more of the software programs may cause the processor to execute fused and/or unfused multiply-add instructions using a leading zero anticipator (LZA), as described herein. The computer system will typically have various other devices/components, such as other buses, memory, peripheral devices, a display, etc. For example, as shown, the computer system 100 may include an I/O interface 120 which may be coupled to a keyboard 122, display device 124, printer 126, mouse 128, and/or other I/O device 130. Thus, various embodiments of the LZA and operation thereof may be performed by a processor inside a computer system.

Figure 2:
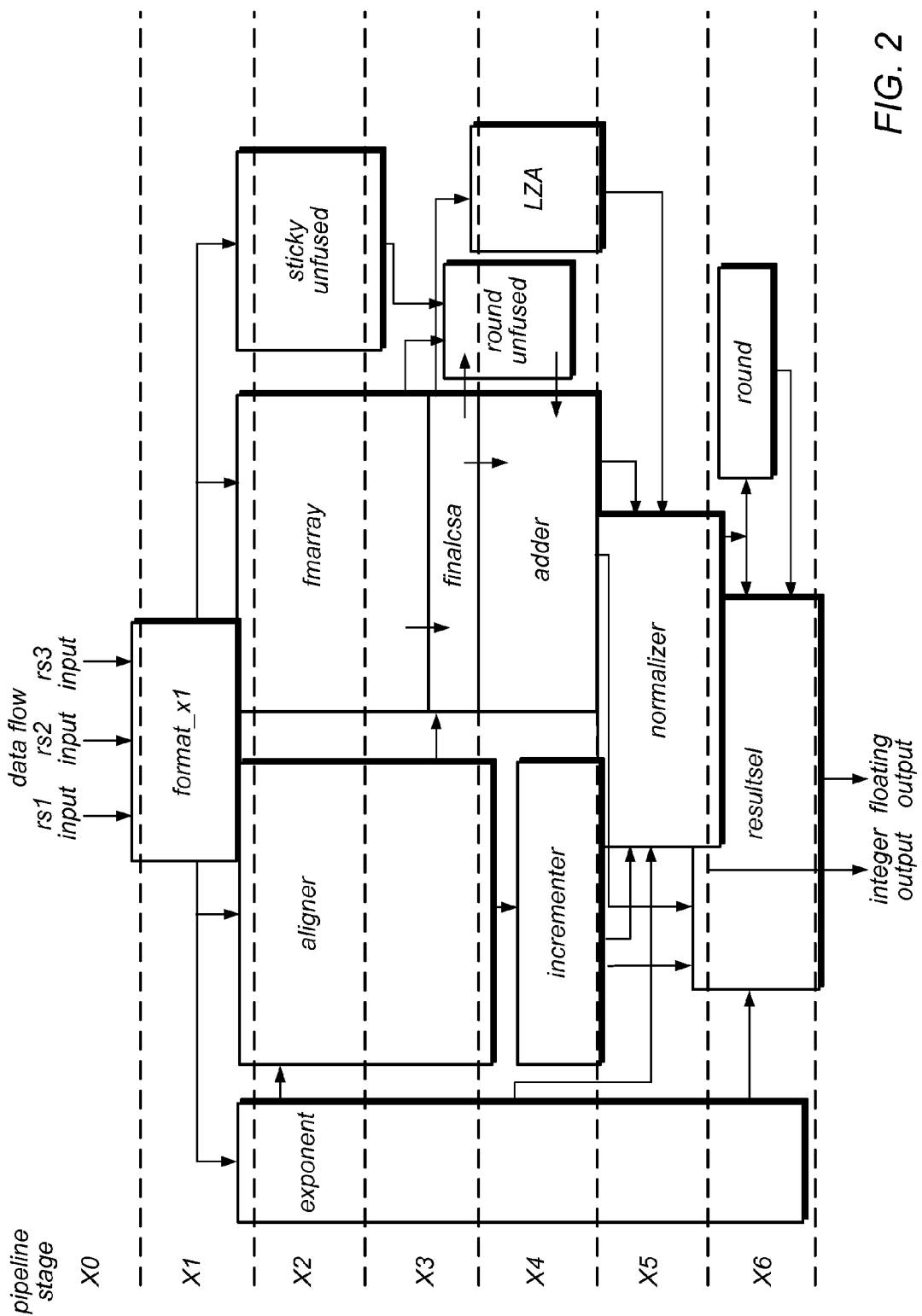
FIG. 2 is a block diagram of an exemplary FUFMA pipeline, according to one embodiment.
Figure 3:
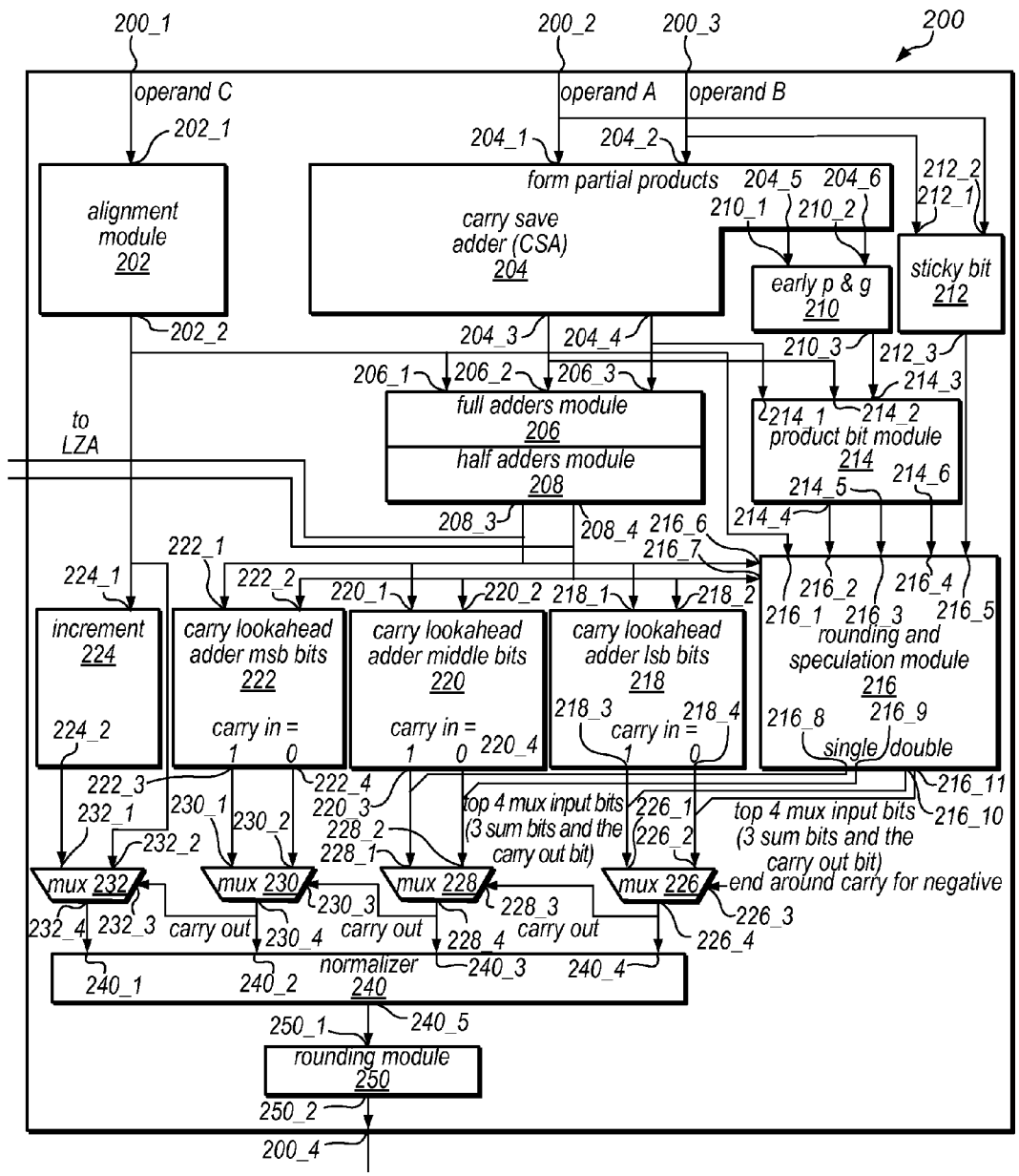
FIG. 3 is a block diagram illustrating a more detailed portion of the FUFMA pipeline, according to one embodiment.

FIGS. 2 and 3—Exemplary FUFMA Pipeline

FIG. 2 is a block diagram of an exemplary FUFMA pipeline. As shown, the FUFMA pipeline may receive rs1 input, rs2 input, and rs3 input (corresponding to terms A, B, and C for performing a FUFMA of (A*B)+C).

In stage 1, the terms may be formatted by format_x1. The output of format_x1 may be provided to exponent, aligner, fmarray, and sticky unfused.

In stage 2, an output of exponent may be provided to the aligner. In stage 3, an output of fmarray as well as an output from the aligner may be provided to finalcsa. An output from fmarray may be provided to round unfused. The output from sticky unfused may be provided to round unfused.

In stage 4, an output from finalcsa may be provided to the LZA. An output from the aligner may be provided to the incrementor. An output from the finalcsa may be provided to the adder (e.g., the carry look ahead adder portion of the FUFMA pipeline). The output from the round unfused may also be provided to the adder. Thus, as shown, the LZA and the adder may operate substantially in parallel.

In stage 5, an output from the exponent may be provided to the normalizer along with outputs from the LZA, adder, and incrementor. In stage 6, an output from the exponent may be provided to resultsel along with outputs from the incrementor, adder, normalizer and round. The round may also receive input from the normalizer. Finally, the floating output may be provided from the end of the resultsel and the integer output may be provided from early in the resultsel.

FIG. 3 is a more detailed block diagram corresponding to a portion of the FUFMA pipeline of FIG. 2 (referred to herein as FUFMA module 200). FIG. 3 and the following description are provided from U.S. patent application Ser. No. 12/020,486, which was incorporated in its entirety above. However, it should be noted that variations to the described FUFMA pipeline are envisioned and can be used in conjunction to the LZA systems and methods described herein.

In one embodiment, the FUFMA module 200 may receive operands from a computer processor, e.g., as shown in FIG. 1 above. In one embodiment, when an opcode provided is a fused multiply-add opcode, FUFMA module 200 may generate a fused multiply add rounding result, and when an opcode provided is an unfused multiply add opcode, FUFMA module 200 may generate an unfused multiply add rounding result. In another embodiment, FUFMA module 200 may receive a single opcode with a deterministic mode bit. If the mode bit is set a first way, e.g., set to one, a fused multiply add result may be generated, and if the mode bit is set a second way, e.g., set to zero, an unfused multiply add rounding result may be generated.

In one embodiment, the FUFMA module 200 includes: an alignment module 204 and a sticky bit module 212, which may selectively receive input operands. For example, FUFMA module 200 may receive an input operand C, an additional term, at input 200_1, an input operand A, a first multiply term, at input 200_2, and an input operand B, a second multiply term, at input 200_3.

Alignment module 202 may receive inputs, such as input operand C, at input 202_1. Alignment module 202 is connected, at output 202_2 to: an increment module 224, at input 224_1; a mux module 232, at input 232_2; a full adders module 206, at input 206_1; and, a rounding and speculation module 216, at input 216_1.

Increment module 224 is connected, at output 224_2, to mux module 232, at input 232_1. outputs from mux module 232, at output 232_4 may be input to a normalizer 240, at input 240_1.

CSA module 204 may receive inputs, such as input operand A, at input 204_1, and input operand B, at input 204_2. CSA module may perform multiplication, e.g., using a Wallace tree, to produce two partial product s and t. CSA module 204 may be further connected, at output 204_3, to full adders module 206, at input 206_2, and to a product bit module 214 at input 214_2. Full adders module 206 may be configured to receive the two partial products s 206_3 and t 206_2 as well as an aligned form of operand C 206_1 and produce two output terms. In some embodiments, e.g., when the multiply add operation is an unfused multiply add operation, the terms s and t may be truncated. However, when the multiply add operation is fused, the terms s and t may not be truncated.

CSA module 204 may be further connected, at output 204_4, to full adders module 206, at input 206_3, and to product bit module 214, at input 214_1. CSA module 204 is further connected, at output 204_5, to an early propagate and generate (p&g) module 210, at input 210_1; and, also connected, at output 204_6, to input 210_2. Early p&g module 210 is further connected, at output 210_3, to product bit module 214, at input 214_3.

Sticky bit computation module 212 may also receive input of operand A, at input 212_2, and input of operand B, at input 212_1. Sticky bit computation module 212 is further connected, at output 212_3, to rounding and speculation module 216, at input 216_5.

Full adders module 206 is further connected to half adders module 208. For example, although not shown, full adders module 206 is connected, at output 206_4, to half adders module 208, at input 208_1, and also connected, at output 206_5 to half adders module 208 at input 208_1. The half adder may be used to avoid too great a carry from addition of extra bits, described in more detail below. The half adder may provide outputs x 208_4 and y 208_3 from the outputs of the full adder.

Half adders module 208 is further connected to carry look-ahead adders (CLAs) 218, 220, and 222, and to rounding and speculation module 216. More particularly, half adders module 208 is connected, at output 208_3, to: input 218_1 of CLA 219; to input 220_1 of CLA 220; and, to input 222_1 of CLA 222; and to input 216_6 of rounding and speculation module 216. Further, half adders module 208 is connected at output 208_4, to: input 218_2 of CLA 218; to input 220_2 of CLA 220; to input 222_2 of CLA 222; and to input 216_7 of rounding and speculation module 216. Finally, the half adders module also provides output 208_3 and 208_4 to the LZA of FIGS. 2 and 4, which may be configured to operate substantially in parallel to the CLAs.

CLA 218 is further connected, at output 218_3, to mux module 226, at input 226_1, and, at output 218_4 to mux module 226, at input 226_2. Mux module 226 is further connected at output 226_4 to mux module 228 at input 228_3, and to normalizer 240 at input 240_4.

CLA 220 is further connected, at output 220_3, to mux module 228, at input 228_1, and, at output 220_4 to mux module 228, at input 228_2. Mux module 228 is further connected at output 228_4 to mux module 230 at input 230_3, and to normalizer 240 at input 240_3.

CLA 222 is further connected, at output 222_3, to mux module 230, at input 230_1, and, at output 222_4 to mux module 230, at input 230_2. Mux module 230 is further connected at output 230_4 to mux module 232 at input 232_3, and to normalizer 240 at input 240_2.

Product bit module 214 is further connected to rounding and speculation module 216. More particularly, in one embodiment, product bit module 214 is connected, at output 214_4 to rounding and speculation module 216, at input 216_2. Product bit module 214 is further connected, at output 214_5, to rounding and speculation module 216, at input 216_3. Product bit module 214 is also connected, at output 214_6, to rounding and speculation module 216, at input 216_4.

In one embodiment, rounding and speculation module 216 is connected, at output 216_11 to mux module 226 at 226_2 and also connected, at output 216_10, to mux module 226, at input 226_1.

Rounding and speculation module 216 is connected, at output 216_9 to mux module 228, at input 228_2, and also connected at output 216_8, to mux module 228, at input 228_1.

Normalizer module 240 is connected at output 240_5, to rounding module 250, at input 250_1. The result of rounding module 250 is output, at output 250_2, and further output from the UFMA 200, at output 200_8.

In the present embodiment, FUFMA module 200 receives an input, such as a single unfused multiply add rounding opcode, which may initiate an unfused multiply add rounding mode, or receives an input, such as a single fused multiply add rounding opcode, which may initiate a fused multiply add rounding operation, also termed as a fused multiply add rounding mode.

As indicated above, further details regarding the FUFMA module 200 can be found in U.S. patent application Ser. No. 12/020,486, which was incorporated in its entirety above.

Figure 4:
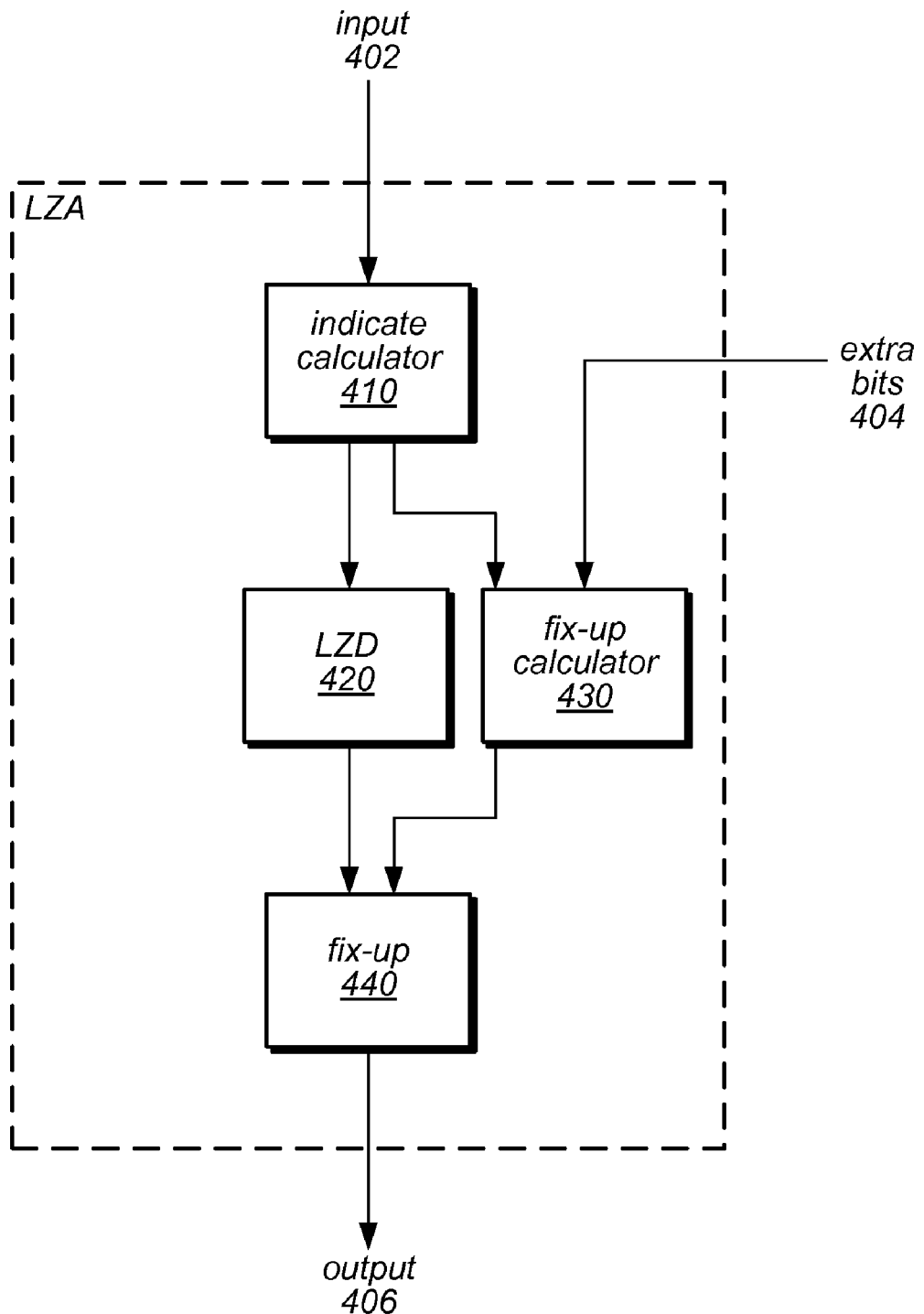
FIG. 4 is an exemplary block diagram of a leading zero anticipator (LZA) of the FUFMA pipeline, according to one embodiment.

FIG. 4—Block Diagram of the Exemplary LZA

FIG. 4 illustrates a block diagram of an exemplary LZA, such as the one shown in FIG. 2 above. The exemplary LZA may include all or portions of the elements described in U.S. patent application Ser. No. 11/964,611, which was incorporated in its entirety above, provides one implementation of the LZA. However, the LZA may be modified according to embodiments described below.

At input 402, the LZA may receive two terms x and y corresponding to the addition of the two partial products s and t and the shifted term C from compression logic, such as the full adder and half adder described above. The terms s and t may have been truncated, e.g., if the operation is an unfused multiply add, or may not be truncated e.g., if the operation is a fused multiply add. Alternatively, or additionally, the LZA may receive the terms s and t (corresponding to the partial products from the multiplication of A*B in the multiply add operation of (A*B)+C) as well as the aligned or shifted C term before being processed by compression logic, as desired.

As shown, the input may be provided to indicator calculator block 410, which may be configured to calculate indicator bits for the received terms. Indicator bits may be calculated using any of a variety of methods, such as those described in U.S. patent application Ser. No. 11/964,611 and/or the Schmookler reference, which were incorporated in their entirety above. However, other methods, such as those known by those of skill in the art are also envisioned. The output of the indicator calculator block 410 may be a string of bits having approximately the same number of leading zeros as the sum output (which may be calculated substantially in parallel, as described herein).

Correspondingly, the output of the indicator calculation block 410 may be provided to a leading zero detector (LZD) 420 along the critical path. The LZD 420 may accept the output of the indicator calculator block 410 to produce a leading zero estimation which is usable (in most cases) for normalizing the output of the adder shown in FIGS. 2 and 3 above. However, in some cases, e.g., near total cancellation, the output of the LZD 420 may need to be modified or replaced using fix-up logic 440. Near total cancellation may only occur in cases of subtraction where the terms almost cancel each other in the subtraction. In other words, near total calculation may occur when the most significant bits of the subtraction are near the least significant bits of the terms (e.g., the term C, and/or the truncated product of A*B). Near total catastrophic cancellation is distinguished from catastrophic cancellation in that catastrophic cancellations typically do not nearly totally cancel the two added numbers (e.g., as indicated above regarding the most and least significant bits being similar). More detailed descriptions of the near total catastrophic cancellations are provided below.

Accordingly, in parallel to operation of LZD 420, fix-up calculator 430 may receive extra bits via input 404 as well as the indicator bits from indicator calculator 410. The extra bits may include one or more of a plurality of values MSB, L, S, M, Xs, and Xt. MSB may be the bit in the most significant position of the product, L may be a carry in from a right most number of bits of the received terms, S may be a rounding bit of the received terms, M may be a negate bit of the received terms, Xs may be the most significant truncated bits of a first received term, and Xt may be the most significant truncated bits of a second received term. However, in specific embodiments, only the values MSB, L, Xs, and Xt may be used as the other terms S and M may not be received in time. Note that some of these values may not have been available during the calculation of the indicator bits by indicator calculator 410. Alternatively, the fix up calculator 430 may receive bits K and W instead of bits L, Xs, and Xt, where W is the sum bit of the sum of L, Xs, and Xt and K is the carry out bit of the sum L, Xs, and Xt.

Fix-up calculator 430 may determine if near total catastrophic cancellation has occurred as well as comparison of the present values (e.g., the indicator bits, extra bits, and/or initially received terms) to various cases which may require modification to or replacement of the output of LZD 420.

Accordingly, the fix-up calculator 430 may provide output to fix-up logic 440 which allows the fix-up logic 440 to modify or replace the output from LZD 420 as necessary. Note that by operating substantially in parallel to the LZD 420, the critical path of the LZA may be minimally affected.

The fix-up logic 440 may receive the output from LZD 420 as well as the fix-up calculator 430 and replace or modify the output of the LZD 420 if necessary. As indicated below, the fix-up logic may be implemented using a plurality of gates and/or muxes, among other possibilities. The fix-up logic 440 may minimally affect the critical path of LZA, e.g., only delaying the output of the LZA by, for example, 1 or 2 gates.

Thus, the LZA may produce a final correct LZA output at output 406. In some embodiments, as described above, the final output may be produced via modification of a first leading zero estimation or determination (e.g., from the LZD) to produce a second leading zero estimation. Further descriptions of the corresponding method are provided below with respect to FIG. 5. However, in alternative embodiments, the logic of the LZA may be modified such that only a single leading zero estimation is produced and no fix-up may be necessary (e.g., by delaying indicator calculation until the extra bits can be received and used in the calculation). However, such embodiments may introduce delays that are unacceptable or undesirable.

In the following descriptions, exemplary bitwidths for registers, circuit elements, and values are provided; however, it should be noted that in various embodiments, these values may be different or modified, as desired. For example, while various embodiments are described with respect to single precision calculations (e.g., 24 bit mantissas), those of skill in the art can recognize these embodiments are applicable to double precision, quad precision, or other precision operations, as desired. Additionally, while floating point values with a mantissa of 24 bits are used, embodiments described herein also apply to mantissas of other bit counts.

Figure 5:
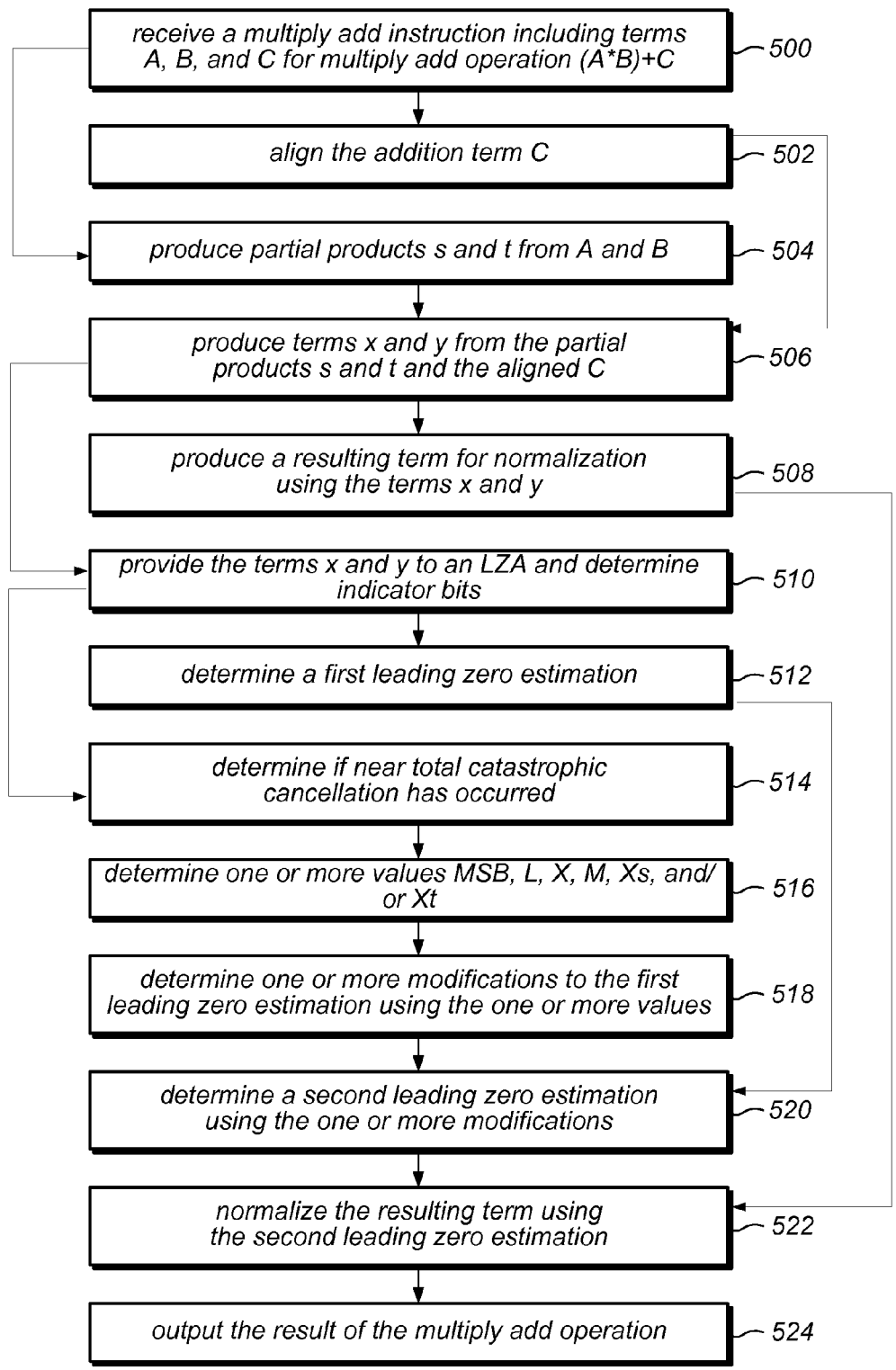
FIG. 5 is a flowchart illustrating a method for modifying a leading zero estimation during catastrophic cancellation in an unfused multiply add operation, according to one embodiment.

FIG. 5—LZA Leading Zero Estimation Modification

FIG. 5 is a block diagram illustrating one embodiment of a method for modifying a leading zero estimation during catastrophic cancellation in an unfused multiply add operation. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 500, a multiply add instruction may be received. As indicated above, a mode setting or mode bit may be set when the multiply add instruction is received, e.g., for determining whether the multiply add instruction should be performed in a fused or unfused manner. Alternatively, or additionally, an opcode may be used for this determination. However, the determination or setting of the mode may be performed at later points, as desired. In primary embodiments described below, the multiply add instruction may be an unfused multiply add instruction.

The multiply add instruction may include or may be transmitted with the terms A, B, and C which may need to be operated as a multiply add as (A*B)+C.

In 502, an addition term (e.g., term C from above) may be aligned to produce an aligned addition term.

In 504, a first partial product s and a second partial product t may be produced based on the terms A and B above, e.g., using a carry save adder (e.g., including a multiply tree such as a Wallace tree). Note that the two partial products s and t may be truncated when performing an unfused multiply add but may not be truncated when performing a fused multiply add. For the remainder of the flowchart description (unless otherwise specified), it will be assumed that the multiply add is unfused and the terms s and t may be truncated.

In 506, the two partial products s and t and the aligned addition term C may be used to produce terms x and y. In some embodiments, 506 may be performed by compression logic, such as a three to two compressor and a half adder (e.g., the full and half adder shown in the systems above). Note that the use of the half adder may limit the carry from extra bits which may be added later.

In 508, the two terms x and y may be used to produce a resulting term for normalization, e.g., by a fused/unfused multiply adder. The fused/unfused multiply adder may be the main adder of the FUFMA pipeline (e.g., the "adder" of FIG. 2 or the CLAs of FIG. 3).

In 510, in parallel (at least substantially) to 508, the terms x and y may be provided to an LZA (such as the LZA described above) and the LZA may determine a leading zero estimation using the terms x and y and/or extra bits. More specifically, in one embodiment, a first portion of the LZA may calculate indicator bits, as described above. During calculation of indicator bits, a default stop bit location may be used which may limit the amount of modifications (described below) required in cases of near total catastrophic cancellations. Further details are provided after the description of this flowchart. As used herein, "substantially in parallel" is intended to include partial parallel computation or execution, i.e., at least a portion of each of the two processes execute or operate concurrently. Substantially in parallel may mean that the two processes overlap significantly, e.g., greater than 80% of the processes concurrently operate.

Accordingly, the indicator bit output may be provided to an LZD of the LZA which may determine a first leading zero estimation in 512. Note that the LZD may not incorporate extra bits (described below) in determining the first leading zero estimation.

In 514, it may be determined if near total catastrophic cancellation has occurred. As indicated above, determining if near total catastrophic cancellation may include determining if the most significant bit of the computation (A*B)+C (e.g., using the terms x and y) is proximate to the least significant bits of the term C and the product of A and B.

In 516, one or more values (e.g., extra bits) may be determined (e.g., one or more of MSB, L, S, M, Xs, and Xt, where L may be the carry in from a right most number of bits from s, t, and the aligned C, S may be a rounding bit of s and t, M may be a negate bit of s, t, and the aligned C, and Xs and Xt may be the most significant truncated bits of s and t respectively). Some of these bits may only be available after the LZA has already begin its determination (e.g., of the indicator bits discussed above).

In 518, one or more modifications to the first leading zero estimation of the LZD may be determined. In some embodiments, the one or more modifications may be determined substantially in parallel to the calculation of the first leading zero estimation in 510, e.g., by a second portion (e.g., a fix-up calculator) of the LZA. The one or more modifications may be determined using the indicator bits from the first portion of the LZA, the terms x and y, and/or the extra bits indicated above. In some embodiments, only the terms MSB, L, Xs, and Xt may be necessary for determining the modifications. Alternatively, only the terms MSB, K and W (which, as described herein, may be calculated using L, Xs, and Xt) may be used to determine the one or more modifications. In some embodiments, the one or more modifications may determine a shift in the first leading zero estimation of the LZD or replace the first leading zero estimation entirely, depending on the conditions. However, it should be noted that the one or more modifications may only be determined if the near total catastrophic cancellation has occurred/is occurring. Otherwise, the output of the LZD may not need to be modified.

In 520, a second leading zero estimation may be determined using the one or more modifications in 518. The second leading zero estimation may be a modification of (and based on) the first leading zero estimation or may simply replace the first leading zero estimation, depending on the implementation. As indicated above, the second leading zero estimation may not be generated or required in cases where near total catastrophic cancellation has not occurred. As indicated above, the first leading zero estimation may be modified/replaced using fix-up logic of the LZA.

In 522, the output of the main fused/unfused adder and the LZA (among other outputs) may be provided to a normalizer, which may normalize the output of the adder using the output of the LZA to produce a normalized term corresponding to the output of the fused or unfused multiply add operation.

In 524, the result of the multiply add operation may be output from the FUFMA.

Similar to descriptions above, note that while modification of a first leading zero estimation is described, the method may be modified to only generate a single accurate leading zero estimation rather than modifying a first estimation to produce a second estimation. In some embodiments, this may involve waiting for the extra bits to be received before proceeding to the LZD; however, such modifications may introduce undesirable delays.

Thus, the above described systems and methods allow for accurate leading zero estimates even when near total catastrophic cancellation occurs.

Additional Information and Catastrophic Cancellation Cases

The following description provides contextual information regarding fused and unfused multiply add operations with respect to the presently described system as well as numerous cases and corresponding adjustments which may be implemented using the LZA and/or in conjunction with the method of FIG. 3. However, note that the information provided below do not limit the scope of the methods and systems described above.

Fused Multiply Add Operations

In fused multiply-add rounding operations, the computation of A*B proceeds by obtaining partial products that, if added together, would produce the result of the product. These partial products are then added in a carry save adder tree (e.g., using a Wallace tree) resulting in two terms whose sum would be the product. For example, if a circuit is used that sums four partial products resulting in two terms (called a four to two compressor), then one could add 24 partial products using a series of four to two compressors.

This produces two terms, s and t that, if added together, would result in the product A*B. However, these two terms are not added together. In parallel, while the four to two compressor computations are being carried out, the input C value is shifted, left or right as needed, to align the binary point of C with the location of the binary point of the product A*B. Further, if subtraction is needed instead of addition (for example, A and B are positive and C is negative, or another example, A, B, and C are all positive and (A*B)−C is requested), then the shifted C is complemented. We will use the term shifted C whether it has been complemented or not. Then the shifted C is summed with terms s and t with, for example, full adders (called three to two compressors).

This produces two terms, x and y that, if added together, would result in (A*B)+C. So, the x and y terms may be sent to a carry lookahead adder to obtain that sum.

While the carry lookahead adder is active, an estimate of the number of leading zeros may be determined with a LZA so that the result of the addition may be normalized (left shifted so that the most significant bit is in one of two specified positions). The LZA needs to produce a result that is either correct or is a value that is one too small (which results in an under shift by one). The final rounding and result formatting can cope with the most significant bit in either of two specified positions.

Unfused Multiply Add Operations and Resulting Cases for Modification

Now we consider the modifications to the above flow needed to accommodate unfused multiply add rounding. For illustration only, the descriptions below use floating point values with a mantissa of 24 bits, but it should be noted that other bit values are envisioned.

First, the output terms of the carry save adder, s and t are considered. If the input mantissas A and B are values between 1 and 2, then the product is between 1 and 4. In descriptions below, X is used to represent a bit, which has the value of 0 or 1. FIG. 6A illustrates an exemplary term s and t.

If the product is between 1 and 2, then the rounded 24 bit mantissa is located one bit to the right of the rounded 24 bit mantissa if the product is between 2 and 4. FIG. 6B illustrates these two cases.

In order that the terms x and y do not contain data from terms s and/or t that do not contribute to the unfused rounded result, the s and t terms may be truncated before being combined with the shifted C term. At the time of the truncation, the value of the product most significant bit (MSB) may not be known (0 if between 1 and 2, 1 if between 2 and 4). Accordingly, the truncation may be performed as if the MSB is 1. FIG. 6C shows the result of the truncation.

If it turns out that the msb of the product, MSB, is 1, then the following three bits may need to be added into the lsb (least significant bit) position of the truncated value (marked in FIG. 6C with an arrow, which is the position of the last X): K, R, and N. Bit K is the carry in from the 24 bits of terms s and t that were replaced with zeros. FIG. 6E shows these extra bits.

That is, the K bit is the carry in that should be included before being added with the shifted C term. Bit R is the rounding bit. If the product A*B needs to be rounded up (instead of truncated down), then the product needs to be incremented. That is the function of the R bit. Finally, if C, in absolute value, is greater than A*B in absolute value, and a subtraction is needed instead of addition, then a one bit (N for negate) needs to be added.

Let P=A*B. If addition is needed, compute P+C. If |P|>|C| and subtraction is needed, then compute P−C=P+~C+1. (Note that C is complemented). If |P|<|C| and subtraction is needed, then compute C−P=−(P−C)=−(P+~C+1)=−(P+~C)−1=~(P+~C)+1−1=~(P+~C). (Note that C is complemented).

When the terms s and t are truncated, it may not be known which subtraction method is needed. Later, when it is determined, 1 may need to be added if |P|>|C|. That is the function of the N bit if all the complemented shifted C values to the right of the arrow position are ones.

On the other hand, if it turns out that the msb of the product, MSB, is 0, then the five bits need to be added as shown in FIG. 6F (truncated s and t terms shown for reference).

The two X bits are the two most significant s and t term bits that were zeroed out and should not have been because, as it turns out, the msb product bit, MSB, is zero instead of one.

These bits are referred to as Xs and Xt. Bit L is the carry in from the right most 23 bits of the 24 bits of terms s and t that were replaced with zeros. The S bit is the rounding bit and the M bit is the negate bit, both similar to the R and N bits except computed for the position one bit to the right of that case.

In order to get the correct sum from the carry lookahead adder for unfused rounding, the MSB bit as well as the K and L bits and the R and S bits are computed while the three to two compressor, half adder, and most of the carry lookahead adder are in progress (in the adder portion described above). By the end of the carry lookahead adder, the N and M bit are also known and an adjustment is made to the adder result to obtain the correct unfused sum. Further details of this can be found in U.S. patent application Ser. No. 12/020,486, which was incorporated in its entirety above. However, it should be noted, to avoid too great a carry from where the extra bits are added in, a half adder needs to be inserted after the full adder (three to two compressor) and before the values go to the carry lookahead adder. That is, we need a half adder after the three to two compressor which accepts the truncated terms s and t, and the shifted C, which may provide the terms x and y.

The data flow for unfused rounding is as follows: FIG. 6A shows the initial terms s and t. In FIG. 6G, truncation is performed and the shifted C term is also shown. FIG. 6H shows the output after the full adders. FIG. 6I shows the result after the half adders.

Notice how the position of the least significant possible non-zero in the carry output shifts to the left one bit for the full adders and another bit for the half adders. For most of the situations the LZA need not be concerned about unfused rounding. The fact that often extra bits are added into the least significant bit positions may typically have no effect on the possible positions of the most significant bit. This is made clear because one of the effects of the half adder is to introduce zeros in the input to the carry lookahead adder, which may also be the input to the LZA.

Consider a half adder. It adds just two bits, producing a sum and a carry. There are only four possibilities: 0+0=00, 0+1=01, 1+0=01, and 1+1=10. Note that in all cases, there is at least one zero in the output, either in the sum or in the carry position. In fact, the LZA algorithm of U.S. patent application Ser. No. 11/964,611, which was also incorporated in its entirety above, takes advantage of this. However, note that the modifications described herein are not dependent upon what LZA algorithm is used. Because of the existence of many zeros in the input to the LZA, if the position of the most significant one bit for the output of the carry lookahead adder is not near the least significant bit of the rounded product, the adding of the extra bits cannot effect that position. For example, if the terms in FIG. 6I were the terms in FIG. 6K, the leading zero algorithm would specify the position marked with the arrow (the last 0 in the first "0100" of the carry output). Thus, the most significant bit is either in the marked position or one position to its right.

Now, if in fact additional bits need to be added, the result would be something like the result in FIG. 6L, and if these five bits are all ones, it would be equivalent to FIG. 6M which starting one position to the left of the added 101, has no more effect than a carry-in would have, and all leading zero estimation algorithms cope with the possibility of a carry from below in every position. However, when there is nearly total catastrophic cancellation, the position of the most significant one is near the extra added bits. Because of the requirement that the LZA must produce a result that is either correct or one position to the left of the final position of the most significant one bit, the result of the LZA must take into account the extra bits when there is nearly total catastrophic cancellation.

The problem is that when the LZA must start, the values of some of the extra bits may not be known. Accordingly, an adjustment of the output of the LZA is needed based on the values of at least some of the extra bits.

As indicated above, for illustration, a mantissa of 24 bits is used below, although there is no restriction with regard to the size of the mantissa. The product of two 24 bit values results in either a 47 bit value (in which case the msb of the product, MSB, is zero) or a 48 bit value (in which case the msb of the product, MSB, is one). If the bit positions are numbered from right to left, starting with zero, then the MSB position is number 47, the position for the K, R, and N bits is 24, and the position for the L, S, M, and two bits Xs and Xt is 23.

However, modifications described herein may only apply to nearly total catastrophic cancellation. This is when the most significant bit of the entire computation (A*B)+C is somewhere near 24. Since the msb of the product is always in position 46 or 47, if addition of the C mantissa is needed, the resulting msb of the entire computation is 46 or higher and so there cannot be catastrophic cancellation. Hence, concern may only be devoted to the subtraction cases.

If position 47 of the product is a one (MSB=1), then the shifted C term (before negation) must be in position 46, 47, or 48 for catastrophic cancellation. Hence, the shifted and negated term has known ones at and below position 22. Likewise, if position 47 of the product is a zero (MSB=0), then the shifted C term (before negation) must be in position 45, 46, or 47 for catastrophic cancellation. Hence, the shifted and negated term has known ones at and below position 21.

The leading zero estimation algorithms may provide two vectors, LZ and LO. First, the LZ vector is considered. Recall that if |P|>|C|, then there will be leading zeros once the carry lookahead addition is done, and then a plus one needs be added in the least significant position. The leading zero estimation algorithms may provide a vector (LZ) which has a bit on in each position where the most significant one bit may first occur. Each bit that is on is called a stop bit as shifting may need to be stopped while normalizing the result when the shifting would reach this bit. Thus, the first such bit encountered (from left to right) will stop the shifting. This vector is called LZ as it is looking for where the leading zeros could end. The first such bit on (from left to right) marks a position where the most significant one bit is expected to be either at that location or the next location to the right.

Now, consider the LO vector. Recall that if |P|<|C|, then there will be leading ones once the carry lookahead addition is done, and the entire result may need to be complemented. The leading zero estimation algorithms may provide another vector (LO) that has a bit on in each position where the most significant zero may first occur. Each bit that is on is called a stop bit as shifting may need to be stopped while normalizing the result when the shifting would reach this bit. Thus, the first such bit encountered (from left to right) will stop the shifting. This vector is called LO as it is looking for where the leading ones could end. The first such bit on (from left to right) marks a position where the most significant zero bit (before the final complement) is expected to be either at that location or the next location to the right. After the final complement, the most significant zero bit becomes the most significant one bit.

The position of the left most stop bit specified from these two vectors is the result of the leading zero estimation algorithm and, which vector it is taken from may indicate which of |P| and |C| is larger. The problem is that these two vectors are obtained and analyzed before some of the extra bits are available. While this is happening, some additional of the extra bits become available and then this information may be used to modify the result of the leading zero estimation.

Shift Modification Cases

The following considers the cases to be analyzed for shift modification. There are six groups for analysis. These groups are: 1) MSB=1 and LZ has the left most stop bit, 2) MSB=1 and LO has the left most stop bit (or the left most stop bits of LO and LZ are in the same position), 3) MSB=1 and there are no LO and no LZ stop bits, 4) MSB=0 and LZ has the left most stop bit, and 5) MSB=0 and LO has the left most stop bit (or the left most stop bits of LO and LZ are in the same position), and 6) MSB=0 and there are no LO and no LZ stop bits.

Group 1: MSB=1 and LZ has the left most stop bit. Accordingly, the product is between 2.0 and 4.0 and since LZ has the left most stop bit, the C term must be positioned in 47 through 24 or 46 through 23 for catastrophic cancellation to occur. Since we are only considering cancellation cases, this is a subtraction and so the C term has been complemented. Hence it must be all ones outside the range of 47 through 23.

Truncation result is shown in FIG. 6N, full adders result is shown in FIG. 6O, and half adders result is shown in FIG. 6P. From the output of the half adders, no leading zero vector stop bit (LZ bit on) can be in positions 0 through 22. So for the leading zeros position and MSB=1, only positions 23, 24, and 25 may need to be checked. For positions 26 and above, adding in the extra bits cannot affect the possible positions for the leading one. However, just to be safe, position 26 may be checked as well.

Group 2: MSB=1 and LO has the left most stop bit (or the left most stop bits of LO and LZ are in the same position). Accordingly, the product is between 2.0 and 4.0 and since LO has the left most stop bit, the C term must be positioned in 48 through 25 or 47 through 24. Since only catastrophic cancellation cases need be considered, this is a subtraction and so the C term has been complemented. Hence it must be all ones outside the range of 48 through 24.

Truncation is shown in FIG. 6Q, full adders result is shown in FIG. 6R, and half adders result is shown in FIG. 6S. From the output of the half adders, no leading one vector stop bit (LO bit on) can be in positions 0 through 23. So for the leading ones position and MSB=1, only positions 24 and 25 may be checked. For positions 26 and above, adding in the extra bits cannot affect the possible positions for the leading one. However, just to be safe, position 26 may be checked as well.

However, the above analysis requires some modification. The value of MSB is correct for the final result, but the truncated s and t terms are not "correct" for the final result precisely because they have been truncated. Since the LZA only sees the values that have been affected by truncation, the LO case can be created when the true value would have been the LZ case. As an example, consider FIG. 6T, which sums to FIG. 6U, and so MSB=1 (See FIG. 6V). Note that the shifted C term is positioned in 46 through 23, and so the result of subtracting the C term from the rounded product is shown in FIG. 6W.

Note the |P|>|C|, so one would think that this would be a leading zeros case (LZ) as in group 1 above. But this would be wrong. Truncation is performed resulting in FIG. 6X. This is combined with the shifted complemented C as shown in FIG. 6Y, and so the output of the full adders is shown in FIG. 6Z.

The half adders produce no change, and the result is a leading ones case (LO) with the first (and only) stop bit in position 23. Note that the first (and only) LZ stop bit is also in position 23. Since the left most stop bits of LO and LZ are in the same position, the is an LO case, as can be seen since the addition of the sum output and the carry output results in leading ones, not leading zeros. Accordingly, position 23 needs to be checked as well.

Group 3: MSB=1 and neither LO nor LZ has any stop bits. Accordingly, the product is between 2.0 and 4.0. This happens if the C term (before being complemented) is exactly equal to the sum of the truncated s and t terms. The C term most significant bit may be lined up with the most significant bit of the sum, which is in position 47, as shown in FIG. 6AA.

Also, the most significant bit of the sum of the truncated s and t terms may be in position 46. In that case, the sum and carry outputs as shown above can occur, but the C term msb is in position 46. These situations need to be examined to determine and create the correct shift output.

Group 4: MSB=0 and LZ has the left most stop bit. Accordingly, the product is between 1.0 and 2.0 and since LZ has the left most stop bit, the C term must be positioned in 46 through 23 or 45 through 22 for catastrophic cancellation to occur. Considering only cancellation cases, this is a subtraction and so the C term has been complemented. Hence, it must be all ones outside the range of 46 through 22. Truncation is shown in FIG. 6AB, the result of full adders is shown in FIG. 6AC, and the result of the half adders is shown in FIG. 6AD.

From the output of the half adders, no leading zero vector stop bit (LZ bit on) can be in positions 0 through 21. So for the leading zeros position and MSB=0, only positions 22, 23, 24, and 25 may need to be checked. For positions 26 and above, adding in the extra bits cannot affect the possible positions for the leading one. However, just to be safe, position 26 may also be checked.

Group 5: MSB=0 and LO has the left most stop bit (or the left most stop bits of LO and LZ are in the same position). Accordingly, the product is between 1.0 and 2.0 and since LO has the left most stop bit, the C term must be positioned in 47 through 24 or 46 through 23. Considering catastrophic cancellation cases, this is a subtraction and so the C term has been complemented. Hence, it must be all ones outside the range of 47 through 23. Truncation, full adders, and half adders results are shown in FIG. 6AE-6AG.

From the output of the half adders, no leading one vector stop bit (LO bit one) can be in positions 0 through 22. So for the leading ones position and MSB=1, only positions 23, 24, and 25 may need to be checked. For positions 26 and above, adding in the extra bits cannot affect the possible positions for the leading one. However, just to be safe, position 26 may be checked as well. Note that if it is a true leading ones case (not a leading zero case that looks like a leading ones case, as described immediately below), then the sum output in bit position 22 is always a one, as shown above.

Similar to group 2 above, further modification may be necessary. The value of MSB is correct for the final result, but the truncated s and t terms are not "correct" for the final result precisely because they have been truncated. Since the LZA only sees the values that have been truncated, the LO case can be created when the true value would have been the LZ case. As an example, consider FIG. 6AH, which sums to FIG. 6I, and so the msb=0, as shown in FIG. 6AJ.

Note that the shifted C term is positioned in 45 through 22, and so the result of subtracting the C term from the rounded product is shown in FIG. 6AK.

Note the |P|>|C|, so one would think that this would be a leading zeros case (LZ) as in group 4 above. But this would be wrong. Truncation is performed, resulting in FIG. 6AL, which is combined with the shifted complemented C as shown in FIG. 6AM, and so the output of the full adders is shown in FIG. 6AN.

The half adders produce no change, and so what we get is a leading ones case (LO) with the first (and only) stop bit in position 22. Note that the first (and only) LZ stop bit is also in position 22. Since the left most stop bits of LO and LZ are in the same position, the is an LO case, as can be seen since the addition of the sum output and the carry output results in leading ones, not leading zeros. So the claim that positions 23 and 24 for the LO cases is not correct as position 22 needs to be checked as well.

Group 6: MSB=0 and neither LO nor LZ has any stop bits. Accordingly, the product is between 1.0 and 2.0. This can happen only if the C term (before being complemented) is exactly equal to the sum of the truncated s and t terms. So the C term most significant bit may be lined up with the most significant bit of the sum, which is in position 46, as shown in FIG. 6AO.

Also, the most significant bit of the sum of the truncated s and t terms may be in position 45. In that case, the sum and carry outputs may occur as shown above, but the C term most significant bit is in position 45. These situations need to be examined to determine and create the correct shift output.

In the following analysis for when MSB=0, the sum of L+Xs+Xt is used instead of the three individual bits. L+Xs+Xt=KW. Note that the bit in the twos position (also sometimes called the carry out position), K, is the same carry in for position 24 used for the cases where MSB=1.

Now, consider the 20 cases where the LZA algorithm might not provide the correct result. a, b, c, and d are used for the sum output positions 25, 24, 23, and 22, respectively, when the value could be 1 or 0.

CASE 1: from group 1, MSB=1, first LZ stop bit in position 23. For the LZ stop bit to be in position 23, the output of the half adders must be that shown in FIG. 6AP.

The position where the half adder outputs are both 1 (38 above) is not important. If K and R are both zero, the most significant one bit will be in position 23 as the +1 will carry up to that position. If exactly one of K and R is a one, then the most significant one bit will be in position 24. If both K and R are ones, then the most significant one bit will be in position 25. So this is the first example of where the LZA cannot possibly guarantee the most significant one in one of two positions with only the half adder outputs sum and carry since there are three positions, 23, 24, and 25, where the most significant one bit could be. For this case, if K is zero, then the most significant one bit will be in position 23 or 24. If K is one, then the most significant one bit will be in position 24 or 25.

CASE 2: from group 1, MSB=1, first LZ stop bit in position 24. For the LZ stop bit to be in position 24, the output of the half adders must be that shown in FIG. 6AQ.

If K and R are both zero, the most significant one bit will be in position 24 as the +1 will carry up to that position. If exactly one of K and R is a one, then the most significant one bit will be in position 25. If both K and R are ones, then the most significant one bit will also be in position 25. The most significant one bit will always be in position 24 or 25. Even though only two positions are possible for this case, without some kind of modification, the leading zero estimator will provide an incorrect result. The first stop bit is in position 24, so the LZA would identify the two possible positions for the most significant one bit as 24 and 23, not the correct positions of 25 and 24.

CASE 3: from group 1, MSB=1, first LZ stop bit in position 25. For the LZ stop bit to be in position 25, the output of the half adders must be that shown in FIG. 6AR, where the bit c is either a zero or a one. Consider the possibilities:

| value of bit c | sum of bits K and R | position of most significant 1 |
| --- | --- | --- |
| 0 | 0 | 24 |
| 1 | 0 | 25 |
| 0 | 1 | 25 |
| 1 | 1 | 25 |
| 0 | 2 | 25 |
| 1 | 2 | 26 |

Note that for this case, if K is zero, then the sum of K and R is 0 or 1, so the most significant one bit will be in position 24 or 25. However, if K is one, then the sum of K and R is 1 or 2, so the most significant one bit will be in position 25 or 26.

CASE 4: from group 1, MSB=1, first LZ stop bit in position 26. For the LZ stop bit to be in position 26, the output of the half adders must be that shown in FIG. 6AS, where each bit b and c may be either a zero or a one. Only the extreme cases may need to be considered. The smallest possible value is if b, c, K, and R are all zeros. In that case, the most significant bit is in position 25. The largest possible value is if b, c, K, and R are all ones. In that case, the most significant bit is in position 26. So in all cases, the most significant bit will be either in position 25 or 26. In this case, the LZA provides the correct result without modification, as expected.

CASE 5: from group 2, MSB=1, first LO stop bit in position 23. For the LO stop bit to be in position 23, the output of the half adders must be that shown in FIG. 6AT.

If K and R are both zero, then the final result would have to be complemented and so the most significant zero bit may be in position 23 since there will not be a plus one added. After the final complement, position 23 will contain the most significant one bit. If exactly one of K and R is a one, then the final result would have to have a plus one added and so we look for the most significant one bit, which will be in position 23 as the plus one will carry up to that position. If both K and R are ones, then again a plus one is added and so we look for the most significant one bit, which will be in position 24 where the K and R bits are located. So the most significant one bit will either be in position 23 or 24. Even though only two positions are possible for this case, without some kind of modification, the LZA will provide an incorrect result.

The first stop bit is in position 23, so the LZA would identify the two possible positions for the most significant one bit as 23 and 22, not the correct positions of 24 and 23. Note that if either or both K and R is a one, this is in reality a leading zeros case but the LZA detects it as a leading ones case.

CASE 6: from group 2, MSB=1, first LO stop bit in position 24. For the LO stop bit to be in position 24, the output of the half adders must be that shown in FIG. 6AU, where the bit c is either a zero or a one. Consider the possibilities:

| value of bit c | sum of bits K and R | position of most significant 1 |
| --- | --- | --- |
| 0 | 0 | complement, add zero, 24 |
| 1 | 0 | complement, add zero, 24 |
| 0 | 1 | complement, add zero, 23 |
| 1 | 1 | true zero, no add, none |
| 0 | 2 | add one, 23 |
| 1 | 2 | add one, 24 |

When there is a true zero, there are no LO or LZ bits on and so there cannot be a most significant one bit. In that case, the value of that the LZA reports may not matter. So, in all other cases, the most significant one bit, after final complement if needed, is in position 24 or 23. So for these cases, the unmodified LZA produces the correct result without modification. Note that if both K and R are ones, this is in reality a leading zeros case but the LZA detects it as as leading ones case.

CASE 7: from group 2, MSB=1, first LO stop bit in position 25. For the LO stop bit to be in position 25, the output of the half adders must be that shown in FIG. 6AV, where each bit b and c may be either a zero or a one. First, the maximum value (if b, c, K, and R are all equal to one) does not cause the leading ones to become leading zeros. Thus, this is always a leading ones situation and never a leading zeros that looks to the LZA as a leading ones case. Hence, in considering the group 2 case, bit c must always be a one, never a zero and no plus one is ever added. Accordingly, the result is shown in FIG. 6AW, where the bit b is either a zero or a one. Consider the possibilities:

| sum of bits b, K, and R | position of most significant 1 |
| --- | --- |
| 0 | 25 |
| 1 | 25 |
| 2 | 24 |
| 3 | true zero, no add, none |

So in all non-zero cases, the most significant bit will be either in position 25 or 24. In this case, the LZA provides the correct result without modification. Recall the for the true zero, it may not matter what value the LZA produces.

CASE 8: from group 2, MSB=1, first LO stop bit in position 26. For the LO stop bit to be in position 26, the output of the half adders must be that shown in FIG. 6AX where each bit a, b, and c may be either a zero or a one. First, observe that the maximum value (if a, b, c, K, and R are all equal to one) does not cause the leading ones to become leading zeros. Thus, this is always a leading ones situation and never a leading zeros that looks to the LZA as a leading ones case. Hence, in considering the group 2 case, bit c must always be a one, never a zero and no plus one is ever added. So the result is shown in FIG. 6AY, where each bit a, and b may be either a zero or a one. For the minimum value (bits a, b, K, and R are all zeros), the leading zero is in position 26. For the maximum value (bits a, b, K, and R are all ones), the leading zero is in position 25. So the leading zero is always in positions 26 or 25. Thus after complementing, the leading one is always in positions 26 or 25. In this case, the LZA provides the correct result without modification, as expected.

CASE 9: from group 3, MSB=1, no stop bits. For there to be no stop bits, the output of the half adders must be that shown in FIG. 6AZ. Consider the possibilities:

| sum of bits K and R | position of most significant 1 |
| --- | --- |
| 0 | true zero, no add, none |
| 1 | add one, 24 |
| 2 | add one, 25 |

So in all non-zero cases, the most significant bit will be either in position 25 or 24. The LZA may need to be modified to output a shift amount as though there had been a stop bit at location 25. Recall that for the true zero, the value produced by the LZA may not matter.

CASE 10: from group 4, MSB=0, first LZ stop bit in position 22. For the LZ stop bit to be in position 22, the output of the half adders must be that shown in FIG. 6BA. Consider the possibilities:

| value of bit K | sum of bits W and S | position of most significant 1 |
|---|---|---|
| 0 | 0 | 22 |
| 0 | 1 | 23 |
| 0 | 2 | 24 |
| 1 | 0 | 24 |
| 1 | 1 | 24 |
| 1 | 2 | 25 |

As before, the LZA may not be able to guarantee the most significant one in one of two positions with only the half adder outputs. In this case, there are four positions, 22, 23, 24, and 25 where the most significant one bit could be. For these cases, if bit K is a 1, then only positions 24 and 25 are possible but if bit K is a zero, there are three positions that are possible, which are 22, 23, and 24. There are several ways to proceed. One way to deal with this is that if K and W are both zero, then only positions 22 and 23 are possible and if K is zero and W is a one, the only positions 23 and 24 are possible.

CASE 11: from group 4, MSB=0, first LZ stop bit in position 23. For the LZ stop bit to be in position 23, the output of the half adders must be that shown in FIG. 6BB. Consider the possibilities:

| value of bit K | sum of bits W and S | position of most significant 1 |
|---|---|---|
| 0 | 0 | 23 |
| 0 | 1 | 24 |
| 0 | 2 | 24 |
| 1 | 0 | 24 |
| 1 | 1 | 25 |
| 1 | 2 | 25 |

If bit K is a 1, then only positions 24 and 25 are possible but if bit K is a zero, only positions 23 and 24 are possible.

CASE 12: from group 4, MSB=0, first LZ stop bit in position 24. For the LZ stop bit to be in position 24, the output of the half adders must be that shown in FIG. 6BC. Consider the possibilities:

| value of bit K | sum of bits W and S | value of bit d | position of the most significant 1 bit |
|---|---|---|---|
| 0 | 0 | 0 | 23 |
| 0 | 0 | 1 | 24 |
| 0 | 1 | 0 | 24 |
| 0 | 1 | 1 | 24 |
| 0 | 2 | 0 | 24 |
| 0 | 2 | 1 | 25 |
| 1 | 0 | 0 | 24 |
| 1 | 0 | 1 | 25 |
| 1 | 1 | 0 | 25 |
| 1 | 1 | 1 | 25 |
| 1 | 2 | 0 | 25 |
| 1 | 2 | 1 | 25 |

If K and d are both zero, then only positions 23 and 24 are possible. However, if either K or d, or both, are not zero, the only positions 24 and 25 are possible.

CASE 13: from group 4, MSB=0, first LZ stop bit in position 25. For the LZ stop bit to be in position 25, the output of the half adders must be that shown in FIG. 6BD. Consider the possibilities:

position of the

| value of bit K | sum of bits c, W and S | value of bit d | most significant 1 bit |
|---|---|---|---|
| 0 | 0 | 0 | 24 |
| 0 | 0 | 1 | 24 |
| 0 | 1 | 0 | 24 |
| 0 | 1 | 1 | 25 |
| 0 | 2 | 0 | 25 |
| 0 | 2 | 1 | 25 |
| 0 | 3 | 0 | 25 |
| 0 | 3 | 1 | 25 |
| 1 | 0 | 0 | 25 |
| 1 | 0 | 1 | 25 |
| 1 | 1 | 0 | 25 |
| 1 | 1 | 1 | 25 |
| 1 | 2 | 0 | 25 |
| 1 | 2 | 1 | 25 |
| 1 | 3 | 0 | 25 |
| 1 | 3 | 1 | 26 |

If K is zero, then only positions 24 and 25 are possible. However, if K is one, the only positions 25 and 26 are possible.

CASE 14: from group 4, MSB=0, first LZ stop bit in position 26. For the LZ stop bit to be in position 26, the output of the half adders must be that shown in FIG. 6BE.

Only the extreme cases may need to be considered. The smallest possible sum is if b, c, d, K, W, and S are all zero. In that case the most significant 1 bit is in position 25. The largest possible sum is if b, c, d, K, W, and S are all ones. In that case the most significant 1 bit is in position 26. In this case, the LZA provides the correct result without modification, as expected.

CASE 15: from group 5, MSB=0, first LO stop bit in position 22. For the LO stop bit to be in position 22, the output of the half adders must be that shown in FIG. 6BF. Consider the possibilities:

| value of bit K | sum of bits W and S | position of the most significant 1 bit |
|---|---|---|
| 0 | 0 | complement, add zero, 22 |
| 0 | 1 | add one, 22 |
| 0 | 2 | add one, 23 |
| 1 | 0 | add one, 23 |
| 1 | 1 | add one, 24 |
| 1 | 2 | add one, 24 |

If K is one, then only positions 23 and 24 are possible. However, if K is a zero, then only positions 22 and 23 are possible.

CASE 16: from group 5, MSB=0, first LO stop bit in position 23. For the LO stop bit to be in position 23, the output of the half adders must be that shown in FIG. 6BG. Consider the possibilities:

| value of bit K | sum of bits W and S | value of bit d | position of the most significant 1 bit |
|---|---|---|---|
| 0 | 0 | 0 | complement, add zero, 23 |
| 0 | 1 | 0 | complement, add zero, 22 |
| 0 | 2 | 0 | add one, 22 |
| 0 | 0 | 1 | complement, add zero, 23 |
| 0 | 1 | 1 | true zero, no add, none |
| 0 | 2 | 1 | add one, 23 |
| 1 | 0 | 0 | add one, 22 |
| 1 | 1 | 0 | add one, 23 |

-continued

| value of bit K | sum of bits W and S | value of bit d | position of the most significant 1 bit |
|---|---|---|---|
| 1 | 2 | 0 | add one, 24 |
| 1 | 0 | 1 | add one, 23 |
| 1 | 1 | 1 | add one, 24 |
| 1 | 2 | 1 | add one, 24 |

If K and d are both one, only positions 23 and 24 are possible. If K is zero, then only positions 22 and 23 are possible, or the result is zero in which case the output of the LZA may not matter. If K is one and d is zero and W is zero, then only positions 22 and 23 are possible, Finally, if K is one and d is zero and W is one, then only positions 23 and 24 are possible.

CASE 17: from group 5, MSB=0, first LO stop bit in position 24. For the LO stop bit to be in position 24, the output of the half adders must be that shown in FIG. 6BH. Consider the possibilities:

| value of bit K | um of bits c, W, & S | value of bit d | position of the most significant 1 bit |
|---|---|---|---|
| 0 | 0 | 0 | complement, add zero, 24 |
| 0 | 1 | 0 | complement, add zero, 24 |
| 0 | 2 | 0 | complement, add zero, 23 |
| 0 | 3 | 0 | complement, add zero, 22 |
| 1 | 0 | 0 | complement, add zero, 23 |
| 1 | 1 | 0 | complement, add zero, 22 |
| 1 | 2 | 0 | add one, 22 |
| 1 | 3 | 0 | add one, 23 |
| 0 | 0 | 1 | complement, add zero, 24 |
| 0 | 1 | 1 | complement, add zero, 24 |
| 0 | 2 | 1 | complement, add zero, 23 |
| 0 | 3 | 1 | true zero, no add, none |
| 1 | 0 | 1 | complement, add zero, 23 |
| 1 | 1 | 1 | true zero, no add, none |
| 1 | 2 | 1 | add one, 23 |
| 1 | 3 | 1 | add one, 24 |

So, if d=1, only positions 23 and 24 are possible, or the result is zero in which case we don't care what the LZA output is. If d=0 and K=1, then only positions 22 and 23 are possible. If d=0, K=0, c=1, and W=1, then again only positions 22 and 23 are possible. Finally, if d=0 and K=0 and either c=0 or W=0, then only positions 23 and 24 are possible.

CASE 18: from group 5, MSB=0, first LO stop bit in position 25. For the LO stop bit to be in position 25, the output of the half adders must be that shown in FIG. 6BI. First, consider the possibilities for d=1, all of which need the complement:

| sum of bits b and K | sum of bits c, W, and S | position of most significant 1 |
|---|---|---|
| 0 | 0 | 25 |
| 0 | 1 | 25 |
| 0 | 2 | 25 |
| 0 | 3 | 25 |
| 1 | 0 | 25 |
| 1 | 1 | 25 |
| 1 | 2 | 24 |
| 1 | 3 | 24 |
| 2 | 0 | 24 |
| 2 | 1 | 24 |
| 2 | 2 | 23 |
| 2 | 3 | true zero |

For d=0, the results are the same as above except for the last line which becomes 2, 3, 22. If K=0 or b=0, then only positions 24 and 25 are possible. If K=1 and b=1, and either W=0 or c=0, then only positions 23 and 24 are possible. But, if K=1, b=1, W=1, and c=1, then only positions 22 and 23 are possible or the result is zero in which case the output of the LZA may not matter.

CASE 19: from group 5, MSB=0, first LO stop bit in position 26. For the LO stop bit to be in position 26, the output of the half adders must be that shown in FIG. 6BJ.

Only extreme cases may need to be considered. The smallest possible sum is if a, b, c, d, K, W, and S are all zero. In that case, the most significant 1 bit is in position 26. The largest possible sum is if a, b, c, d, K, W, and S are all ones. In that case the most significant 1 bit is in position 25. In this case, the LZA provides the correct result without modification, as we expected.

CASE 20: from group 6, MSB=0, no stop bits. For there to be no stop bits, the output of the half adders must be that shown in FIG. 6BK. Consider the possibilities:

| value of bit K | sum of bits W and S | position of most significant 1 bit |
|---|---|---|
| 0 | 0 | true zero, no add, none |
| 0 | 1 | add one, 23 |
| 0 | 2 | add one, 24 |
| 1 | 0 | add one, 24 |
| 1 | 1 | add one, 24 |
| 1 | 2 | add one, 25 |

If K is zero, then only positions 23 and 24 are possible or the result is zero in which case we don't care what the LZA output is. However, if K is one, the only positions 24 and 25 are possible.

The table shown in FIG. 7 summarizes the results above.

Once these table are available, there are many ways one could proceed to make the corrections. Only one of them is described here and further methods are envisioned. If it was not for unfused rounding, no stop bit means that the result is zero and the output of the LZA may not matter. But, as can be known from the above, for unfused rounding, this is not the situation (see cases 9 and 20). So one way to accommodate this is, for unfused rounding, to not let the stop bit be located further than some default position specified before the LZA starts. Then stop can occur either on the first LZ stop bit, the first LO stop bit, or the default location.

There are several reasonable choices for the default stop bit location. Illustrated here, position 25 may be used as the default.

For the default position of 25, the tables are modified as shown in FIG. 8.

In these tables, the stop bit location (without a default stop location) may be left unchanged as that information may be needed to do the modifications, but the positions for leading one bit (using the default stop location) may be changed to indicate what the output of the LZA will be if no modification to that output is made. The table shown in FIG. 9 is a set of modifications that may produce acceptable output. Note that d for cases 12, 16, 17, and 18 is the sum output in position 22, c for cases 17 and 18 is the sum output in position 23, and b for case 18 is the sum output in position 24. So, one only needs to test to see if a subtract 1 or 2, or an add 1 is needed. This testing needs, in addition to the usual LZA inputs, the MSB value of the product and the carry in bit K. To get W, the carry in bit L and the two most significant sum and carry bits that were set to zero during truncation (Xs and Xt) also need to be known. These are bits that are computed for the "any needed correction" to the carry lookahead adder that runs in parallel with the LZA. The determination of whether to subtract 1 or 2, or add 1, can be done while the latter part of the leading zero estimation is in progress, and only the final output may be modified. Since the modification of adding or subtracting is done to a known value (e.g., the default stop bit location, 25), instead of actually carrying out an arithmetic operation, the final result may simply be replace, using a mux, or using AND and OR gates to obtain the final result.

The round bits R and S may not be used to determine any correction. This may be important because the round bits are determined late and are likely not available in time to be used.

Any subtraction adjustment may not exceed the lower bound for the numeric representation of floating point numbers. So any subtraction performed may need to be limited by the smallest exponent permitted for floating point numbers.

The subtract 1 or 2, or add 1 above refers to the stop bit position. If the shift to normalize the result is a right shift, then the shift amount may need to have the same adjustment. However, if the shift is a left shift, then the shift amount may need to add instead of subtract, and subtract instead of add for its adjustment.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for performing leading zero estimation during an unfused multiply add operation, the method comprising:
    receiving, by an fused/unfused multiply adder, a plurality of terms x and y, wherein the terms x and y are usable in performing the unfused multiply add operation of (A*B)+C, and wherein each of the plurality of terms x and y is based on previously truncated terms s and t and a shifted C term, wherein the terms s and t are based on a product of A*B;
    calculating, by a leading zero anticipator (LZA), a first leading zero estimation based on the plurality of terms;
    determining if near total catastrophic cancellation has occurred, comprising determining if a most significant bit of a result of the computation (A*B)+C is proximate to least significant bits of C and a product of A and B;
    determining one or more of a plurality of values MSB, L, S, M, Xs, and Xt, wherein:
        MSB is the value of the most significant bit of A*B;
        L is a carry in from a right most number of bits of the terms s and t;
        S is a rounding bit of the terms s and t;
        M is a negate bit of the terms s, t, and the shifted C term; and
        Xs and Xt are most significant truncated bits of s and t, respectively;
    generating a second leading zero estimation based on the first leading zero estimation and one or more of the plurality of values MSB, L, S, M, Xs and Xt if the near total catastrophic cancellation has occurred, wherein the second leading zero estimation is a modified version of the first leading zero estimation;
    wherein the second leading zero estimation is usable in performing the unfused multiply add operation.

2. The method of claim 1, further comprising:
    performing a normalize operation resulting from the add operation in the unfused multiply add operation using the second leading zero estimation.

3. The method of claim 1, wherein said generating the second leading zero estimation is based on K and W, wherein W is the units bit of the sum of L, Xs, and Xt and K is the twos bit of the sum of L, Xs, and Xt.

4. The method of claim 1, wherein said calculating the first leading zero estimation is not based on the one or more of the plurality of values MSB, L, S, M, Xs, and Xt.

5. The method of claim 1, further comprising:
    receiving the plurality of terms A, B, and C, wherein the terms A, B, and C are usable in calculating the unfused multiply add operation of (A*B)+C;
    calculating terms s and t as partial products of the A*B multiply operation;
    truncating the terms s and t to produce truncated s and truncated t;
    aligning the term C to produce an aligned C term; and
    calculating the terms x and y from the truncated terms s and t and the aligned C term.

6. The method of claim 5, further comprising:
    adding the terms x and y to produce a resulting term;
    performing one or more fix-up operations on the resulting term to produce a resulting fixed-up term; and
    normalizing the resulting fixed-up term using the second leading zero estimation.

7. The method of claim 1,
    wherein said calculating the first leading zero estimation comprises:
        calculating a plurality of indicator bits;
        performing a leading zero determination using the plurality of indicator bits to produce the first leading zero estimation;
    wherein said generating the second leading zero estimation comprises:
        receiving the plurality of indicator bits;
        determining one or more modifications to the first leading zero estimation using the plurality of indicator bits and the one or more of the plurality of values MSB, L, S, M, Xs, and Xt; and
        modifying the first leading zero estimation based on said determining the one or more modifications.

8. The method of claim 7, wherein said performing the leading zero determination and said determining the one or more modifications are performed substantially in parallel.

9. The method of claim 1, wherein said generating the first and/or second leading zero estimation comprises using a stop bit at a location of the first leading zero estimation, wherein the location of the first leading zero estimation does not exceed a default stop bit location.

10. A processor configured to perform fused and unfused multiply add operations, comprising:
    a carry save adder configured to receive two multiply terms A and B and produce two partial products s and t;
    compression logic, configured to:
        receive the two partial products s and t and an aligned addition term C, wherein the two partial products s and t are truncated if the multiply add operation is unfused; and
        produce terms x and y based on the partial products s and t and the aligned addition term C;
    a fused/unfused multiply adder coupled to the compression logic, wherein the fused/unfused multiply adder is configured to:
        receive the two terms x and y; and
        produce a resulting term for normalization;

a leading zero anticipator (LZA), comprising:
- a first portion configured to receive the two terms x and y and determine indicator bits for determining the most significant bit of the resulting term;
- a leading zero detector (LZD) configured to receive the indicator bits to determine the most significant bit of the resulting term; and
- a second portion configured to:
  - receive the indicator bits and one or more of a plurality of values MSB, L, S, M, Xs, and Xt, wherein MSB is the value of the most significant bit of the product A*B, L is a carry in from a right most number of bits of s and t, S is a rounding bit of s and t, M is a negate bit of s, t, and C, and Xs and Xt are most significant truncated bits of s and t, respectively;
  - determine one or more modifications to the output of the LZD based on the indicator bits and the one or more of the plurality of values MSB, L, S, M, Xs, and Xt;
- wherein the LZA is configured to provide a leading zero estimation, wherein the leading zero estimation incorporates the one or more modifications to the output of the LZD if a most significant bit of a result of the computation (A*B)+C is proximate to least significant bits of C and a product of A and B; and
- a normalizer, configured to receive the leading zero estimation from the LZA and the resulting term from the fused/unfused multiply adder to produce a normalized term corresponding to the output of the fused or unfused multiply add operation.

11. The processor of claim 10, wherein the second portion and the LZD are configured to operate substantially in parallel.

12. The processor of claim 10, wherein the compression logic comprises a three to two compressor and a half adder connected successively.

13. The processor of claim 10, wherein the second portion of the LZA is configured to correct the output of the LZD if the most significant bit of the result of the computation (A*B)+C is proximate to the least significant bits of C and the product of A and B.

14. The processor of claim 10, wherein said determining one or more modifications to the outputs of the LZD estimation is based on K and W, wherein W is the units bit of the sum of L, Xs, and Xt and K is the twos bit of the sum of L, Xs, and Xt.

15. A method for performing leading zero estimation during an unfused multiply add operation, the method comprising:
- receiving, by a fused/unfused multiply adder, a plurality of terms x and y, wherein the terms x and y are usable in performing the unfused multiply add operation of (A*B)+C, and wherein each of the plurality of terms x and y is based on previously truncated terms s and t, and aligned term C, wherein the terms s and t are based on a product of A*B;
- determining if near total catastrophic cancellation has occurred, comprising determining if a most significant bit of a result of the computation (A*B)+C is proximate to least significant bits of C and a product of A and B;
- determining one or more of a plurality of values MSB, L, S, M, Xs, and Xt, wherein:
  - MSB is the value of the most significant bit of the product of A*B;
  - L is a carry in from a right most number of bits of the terms s and t;
  - S is a rounding bit of the terms s and t;
  - M is a negate bit of the terms s, t, and the shifted C term;
  - Xs and Xt are most significant truncated bits of s and t, respectively;
- calculating, by a leading zero anticipator (LZA), a leading zero estimation based on the plurality of terms x and y, wherein said calculating the leading zero estimation is also based on the one or more of the plurality of values MSB, L, S, M, Xs, and Xt if the near total catastrophic cancellation has occurred;
- wherein the leading zero estimation is usable in performing the unfused multiply add operation.

16. The method of claim 15, further comprising:
- performing a normalize operation resulting from the add operation in the unfused multiply add operation using the leading zero estimation.

17. The method of claim 15, wherein said generating the leading zero estimation is based on K and W if the near total catastrophic cancellation has occurred, wherein W is the units bit of the sum of L, Xs, and Xt and K the the twos bit of the sum of L, Xs, and Xt.

18. The method of claim 15, wherein said calculating the leading zero estimation comprises using a stop bit at an LZD location, wherein the LZD location does not exceed a default stop bit location.

* * * * *